United States Patent
Cariou et al.

(10) Patent No.: US 10,652,368 B2
(45) Date of Patent: May 12, 2020

(54) PARAMETER ENCODING TECHNIQUES FOR WIRELESS COMMUNICATION NETWORKS

(71) Applicant: INTEL IP CORPORATION, Santa Clara, CA (US)

(72) Inventors: Laurent Cariou, Portland, OR (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/477,089

(22) Filed: Apr. 1, 2017

(65) Prior Publication Data

US 2018/0288200 A1  Oct. 4, 2018

(51) Int. Cl.
*H04L 29/08* (2006.01)
*H04W 80/10* (2009.01)
*H04L 29/06* (2006.01)
*H04L 1/00* (2006.01)
*H04W 28/02* (2009.01)

(52) U.S. Cl.
CPC .......... *H04L 69/323* (2013.01); *H04L 1/0083* (2013.01); *H04L 69/16* (2013.01); *H04W 28/0205* (2013.01); *H04W 28/0252* (2013.01); *H04W 80/10* (2013.01)

(58) Field of Classification Search
CPC ..... H04L 1/0007; H04L 1/0083; H04L 45/02; H04L 69/16; H04W 80/10
See application file for complete search history.

(56) References Cited

U.S. PATENT DOCUMENTS

| 6,747,580 | B1 * | 6/2004 | Schmidt | H03M 5/145 |
| | | | | 341/106 |
| 2016/0323878 | A1 * | 11/2016 | Ghosh | H04W 72/0446 |
| 2017/0006608 | A1 * | 1/2017 | Josiam | H04L 5/00 |
| 2017/0265186 | A1 * | 9/2017 | Cariou | H04W 72/0406 |
| 2017/0332277 | A1 * | 11/2017 | Xin | H04W 28/06 |
| 2017/0367099 | A1 * | 12/2017 | Cariou | H04W 16/14 |
| 2018/0084560 | A1 * | 3/2018 | Cho | H04W 12/08 |
| 2018/0139759 | A1 * | 5/2018 | Park | H04W 28/0215 |
| 2018/0367650 | A1 * | 12/2018 | Motozuka | H04B 7/0695 |

\* cited by examiner

*Primary Examiner* — Walli Z Butt
*Assistant Examiner* — Ryan C Kavleski

(57) ABSTRACT

Parameter encoding techniques for wireless communication networks are described. In some embodiments, an apparatus may comprise a memory and logic for a wireless communication device, at least a portion of the logic comprised in circuitry coupled to the memory, the logic to determine a channel usage configuration to be applied for a transmission of a packet to a remote device, the channel usage configuration to designate a primary channel and one or more data transmission channels, generate a PHY header for the packet, the PHY header to comprise a first field comprising information indicating the one or more data transmission channels and a second field comprising information identifying the primary channel, and encode the PHY header for wireless transmission. Other embodiments are described and claimed.

12 Claims, 12 Drawing Sheets

PARAMETER ENCODING TECHNIQUES FOR WIRELESS COMMUNICATION NETWORKS

TECHNICAL FIELD

Embodiments described herein generally relate to wireless communications between devices in wireless networks.

BACKGROUND

In a given wireless communication network, a wireless communication device may have the option of communicating via one of multiple possible bandwidths and/or one or more of multiple possible portions of wireless spectrum within a system bandwidth. Such a wireless communication device may also have the option of designating/utilizing one of multiple possible channels as a primary channel. In order to enable successful communication with other devices in the wireless network, the wireless communication device may need to notify such other devices of the bandwidth and particular portions of wireless spectrum that it is using, as well as the primary channel that it is using.

DETAILED DESCRIPTION

Figure 1:
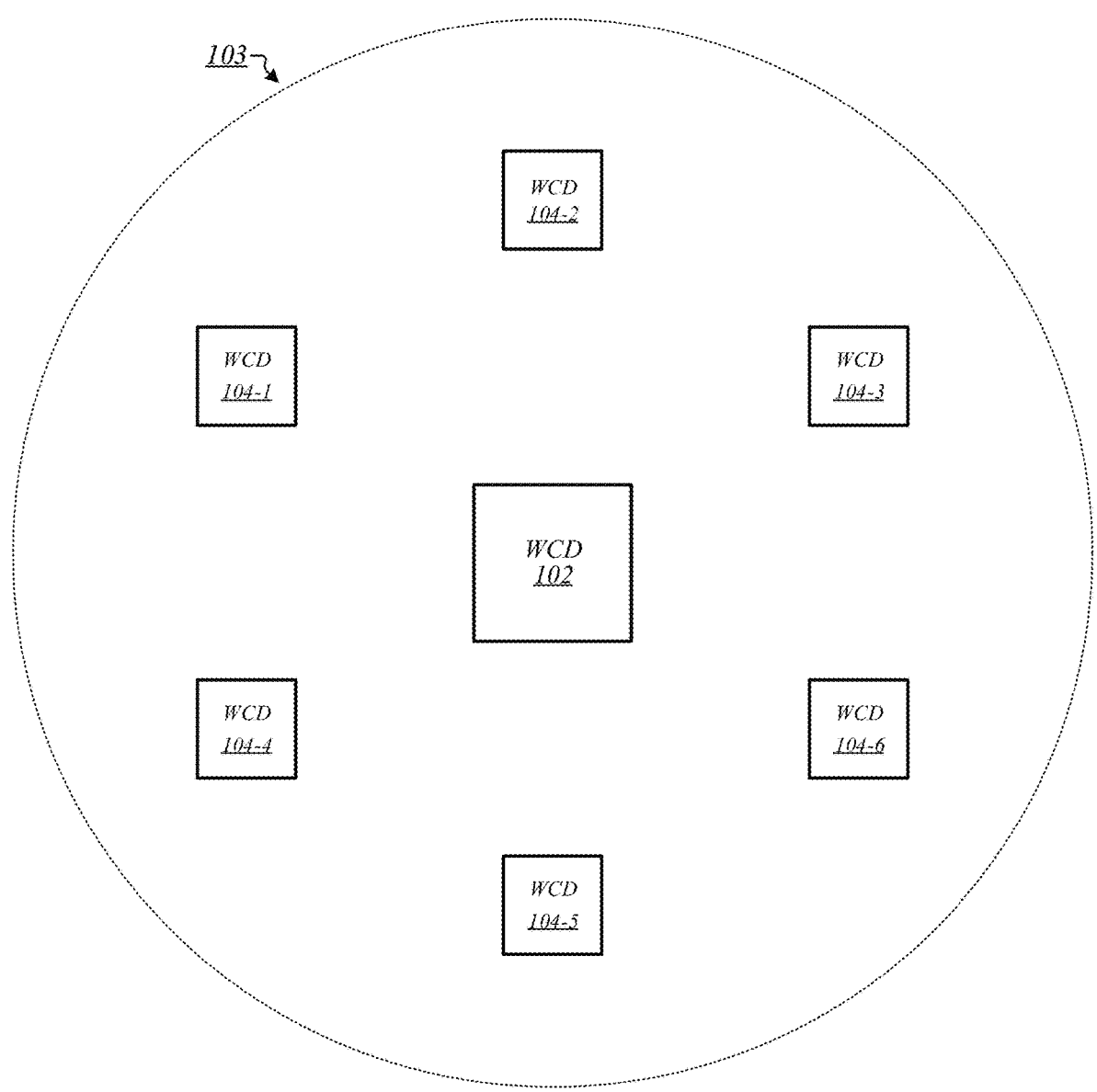
FIG. 1 illustrates an embodiment of a first operating environment.

Various embodiments are generally directed to parameter encoding techniques for wireless communication networks. In some embodiments, an apparatus may comprise a memory and logic for a wireless communication device, at least a portion of the logic comprised in circuitry coupled to the memory, the logic to determine a channel usage configuration to be applied for a transmission of a packet to a remote device, the channel usage configuration to designate a primary channel and one or more data transmission channels, generate a PHY header for the packet, the PHY header to comprise a first field comprising information indicating the one or more data transmission channels and a second field comprising information identifying the primary channel, and encode the PHY header for wireless transmission. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as the IEEE 802.11ad-2012 standard published Dec. 28, 2012, including their predecessors, revisions, progeny, and/or variants. Various embodiments may involve wireless communications performed according to one or more "next-generation" 60 GHz ("NG60") wireless local area network (WLAN) communications standards, such as the IEEE 802.11ay standard that is currently under development. Some embodiments may involve wireless communications performed according to one or more millimeter-wave (mm-Wave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 such as may be representative of various embodiments. In operating environment 100, a wireless communication device (WCD) 102 may wirelessly communicate in a wireless network 103. Wireless communication devices 104-1, 104-2, 104-3, 104-4, 104-5, and 104-6 may also wirelessly communicate in wireless network 103 and/or with wireless communication device 102. In various embodiments, wireless network 103 may comprise a wireless network that utilizes wireless channel frequencies of the 60 GHz band. In some embodiments, wireless communication devices within wireless network 103 may communicate with each other according to one or more standards for 60 GHz wireless communications. For example, in various embodiments, devices within wireless network 103 may communicate with each other according to one or more protocols and/or procedures defined in IEEE 802.11ad-2012, and/or its predecessors, revisions, progeny, and/or variants. In some embodiments, wireless communication devices 102, 104-1, 104-2, 104-3, 104-4, and 104-5 may comprise 60 GHz-capable stations (STAs) such as Directional Multi-Gigabit (DMG) stations (STAs) or enhanced DMG (EDMG) STAs. In various embodiments, some or all of the wireless communication devices within wireless network 103 may communicate with each other according to one or more protocols and/or procedures that may be defined in the IEEE 802.11ay standard that is currently under development. In some embodiments, wireless communication device 102 may operate as a personal basic service set (PBSS) control point/access point (PCP/AP). In various embodiments, wireless communication devices 104-1, 104-2, 104-3, 104-4, and 104-5 may operate as non-PCP/AP STAs. The embodiments are not limited in this context.

Figure 2:
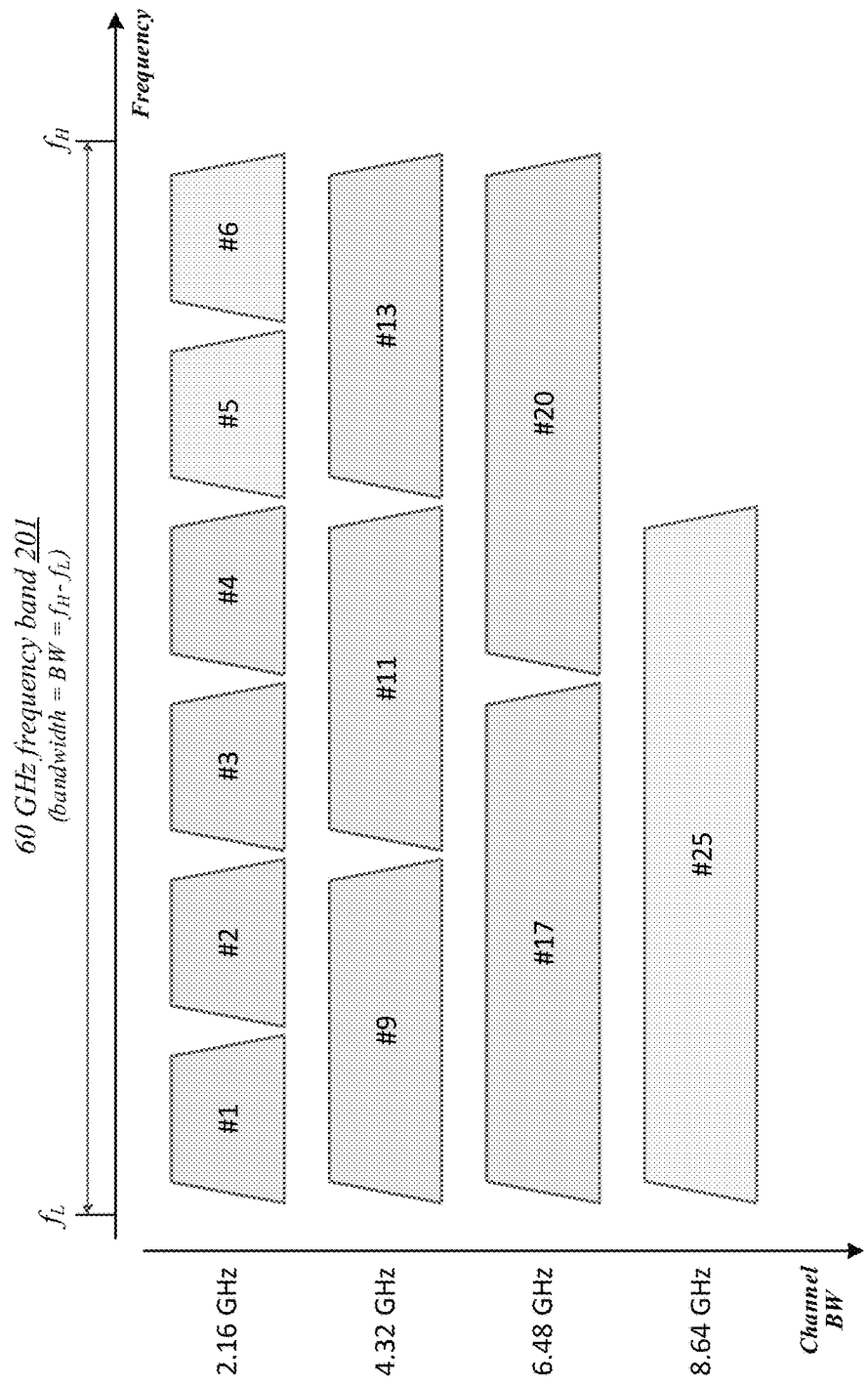
FIG. 2 illustrates an embodiment of a first channelization scheme.

FIG. 2 illustrates an example of a channelization scheme 200 that may be representative of a channelization scheme that may be utilized by a wireless communication protocol implemented in wireless network 103 of FIG. 1 according to various embodiments. According to channelization scheme 200, a plurality of wireless channels are defined, each of which corresponds to a different respective sub-band of a 60 GHz frequency band 201. 60 GHz frequency band 201 spans from a lowest included frequency $f_L$ to a highest included frequency $f_H$, and thus comprises a bandwidth BW that is equal to $f_H - f_L$.

As reflected in FIG. 2, the channels defined by channelization scheme 200 may include channels corresponding to sub-bands of various sizes. In this example, channelization scheme 200 defines non-overlapping 2.16 GHz channels 1, 2, 3, 4, 5, and 6, each of which corresponds to a different respective 2.16 GHz sub-band. These 2.16 GHz channels may be referred to as the "base" channels of channelization scheme 200. Also shown are various "wide" channels, each of which corresponds to a respective sub-band comprising the combined bandwidth of two or more base channels. In this example, the wide channels defined by channelization scheme 200 include 4.32 GHz channels 9, 11, and 13, 6.48 GHz channels 17 and 20, and 8.64 GHz channel 25. Communication via any particular wide channel may generally be implemented by bonding two or more contiguous base channels and modulating across the combined bandwidth of those bonded channels. In this context, the two or more 2.16 GHz base channels that are bonded may be referred to as the "bonded channel set." For example, with respect to 8.64 GHz channel 25, the bonded channel set may comprise 2.16 GHz channels 1, 2, 3, and 4. The identities of the twelve channels depicted in FIG. 2, their sizes, and the bonded channel sets associated with the various wide channels are summarized in Table 1.

TABLE 1

| Channel # | Size | Bonded Channel Set |
|---|---|---|
| 1, 2, 3, 4, 5, 6 | 2.16 GHz | — |
| 9 | 4.32 GHz | 1 and 2 |
| 11 | 4.32 GHz | 3 and 4 |
| 13 | 4.32 GHz | 5 and 6 |
| 17 | 6.48 GHz | 1, 2, and 3 |
| 20 | 6.48 GHz | 4, 5, and 6 |
| 25 | 8.64 GHz | 1, 2, 3, and 4 |

In various embodiments, channelization scheme 200 may be designed to conform to a rule that wide channels are not to overlap in the frequency domain. In some other embodiments, channelization scheme 200 may permit overlap between wide channels, and may define additional wide channels not depicted in FIG. 2. In an example embodiment in which overlap between wide channels is permitted, in addition to the twelve channels listed in Table 1, channelization scheme 200 may define the six wide channels listed in Table 2, and thus a total of 18 channels. The embodiments are not limited to this example.

TABLE 2

| Channel # | Size | Bonded Channel Set |
|---|---|---|
| 10 | 4.32 GHz | 2 and 3 |
| 12 | 4.32 GHz | 4 and 5 |
| 18 | 6.48 GHz | 2, 3, and 4 |
| 19 | 6.48 GHz | 3, 4, and 5 |

TABLE 2-continued

| Channel # | Size | Bonded Channel Set |
|---|---|---|
| 26 | 8.64 GHz | 2, 3, 4, and 5 |
| 27 | 8.64 GHz | 3, 4, 5, and 6 |

Figure 3:
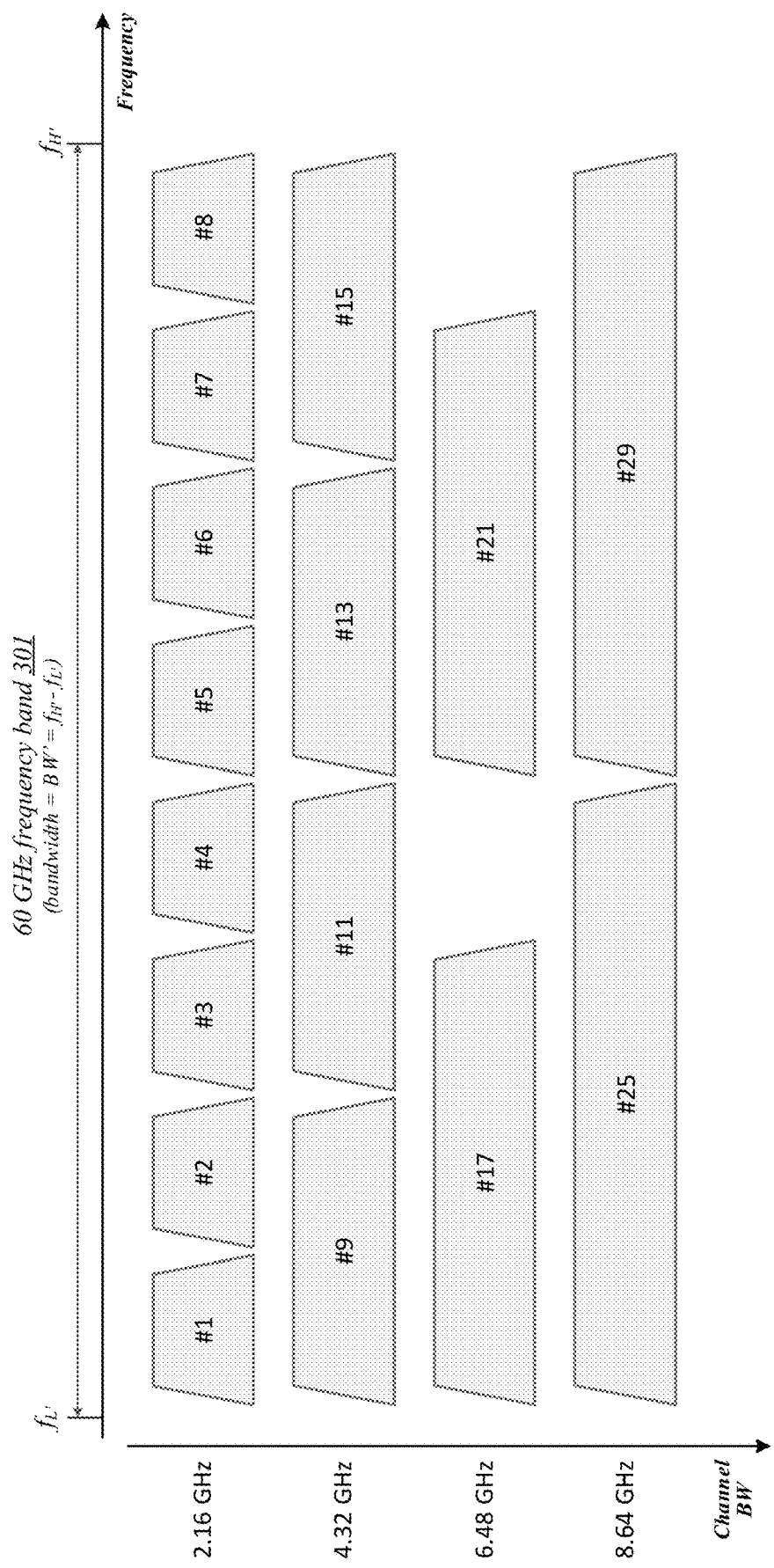
FIG. 3 illustrates an embodiment of a second channelization scheme.

FIG. 3 illustrates an example of a channelization scheme 300 that may be representative of a channelization scheme that may be utilized by a wireless communication protocol implemented in wireless network 103 of FIG. 1 according to various embodiments Like channelization scheme 200 of FIG. 2, channelization scheme 300 defines a plurality of wireless channels, including channels corresponding to sub-bands of various sizes. Each wireless channel defined by channelization scheme 300 corresponds to a different respective sub-band of a 60 GHz frequency band 301. 60 GHz frequency band 301 spans from a lowest included frequency $f_{L'}$ to a highest included frequency $f_{H'}$, and thus comprises a bandwidth BW' that is equal to $f_{H'}-f_{L'}$.

According to some embodiments, the bandwidth BW' of 60 GHz frequency band 301 may be larger than the bandwidth BW of 60 GHz frequency band 201, which may enable the definition/inclusion of additional channels relative to channelization scheme 200 of FIG. 2. In various embodiments, the lowest included frequency $f_{L'}$ of 60 GHz frequency band 301 may be lower than the lowest included frequency $f_L$ of 60 GHz frequency band 201 of FIG. 2. In some such embodiments, the highest included frequency $f_{H'}$ of 60 GHz frequency band 301 may be equal to the highest included frequency $f_H$ of 60 GHz frequency band 201 of FIG. 2. In other embodiments in which $f_{L'}<f_L$, $f_{H'}$ may differ from $f_H$. In various embodiments, the highest included frequency $f_{H'}$ of 60 GHz frequency band 301 may be greater than the highest included frequency $f_H$ of 60 GHz frequency band 201 of FIG. 2. In some such embodiments, $f_{L'}$ may be equal to $f_L$. In other embodiments in which $f_{H'}>f_H$, $f_{L'}$ may differ from $f_L$. The embodiments are not limited in this context.

In the example depicted in FIG. 3, 60 GHz frequency band 301 is large enough to accommodate eight non-overlapping 2.16 GHz base channels—channels 1, 2, 3, 4, 5, 6, 7, and 8. Also defined are various wide channels, including 4.32 GHz channels 9, 11, 13, and 15, 6.48 GHz channels 17 and 21, and 8.64 GHz channels 25 and 29. The identities of the sixteen channels depicted in FIG. 3, their sizes, and the bonded channel sets associated with the various wide channels are summarized in Table 3.

TABLE 3

| Channel # | Size | Bonded Channel Set |
|---|---|---|
| 1, 2, 3, 4, 5, 6, 7, 8 | 2.16 GHz | — |
| 9 | 4.32 GHz | 1 and 2 |
| 11 | 4.32 GHz | 3 and 4 |
| 13 | 4.32 GHz | 5 and 6 |
| 15 | 4.32 GHz | 7 and 8 |
| 17 | 6.48 GHz | 1, 2, and 3 |
| 21 | 6.48 GHz | 5, 6, and 7 |
| 25 | 8.64 GHz | 1, 2, 3, and 4 |
| 29 | 8.64 GHz | 5, 6, 7, and 8 |

In various embodiments, channelization scheme 300 may be designed to conform to a rule that wide channels are not to overlap in the frequency domain. In various other embodiments, channelization scheme 300 may permit overlap between wide channels, and may define additional wide channels not depicted in FIG. 3. In an example embodiment in which overlap between wide channels is permitted, in addition to the sixteen channels listed in Table 3, channelization scheme 300 may define the ten wide channels listed in Table 4, and thus a total of 26 channels. The embodiments are not limited to this example.

TABLE 4

| Channel # | Size | Bonded Channel Set |
|---|---|---|
| 10 | 4.32 GHz | 2 and 3 |
| 12 | 4.32 GHz | 4 and 5 |
| 14 | 4.32 GHz | 6 and 7 |
| 18 | 6.48 GHz | 2, 3, and 4 |
| 19 | 6.48 GHz | 3, 4, and 5 |
| 20 | 6.48 GHz | 4, 5, and 6 |
| 22 | 6.48 GHz | 6, 7, and 8 |
| 26 | 8.64 GHz | 2, 3, 4, and 5 |
| 27 | 8.64 GHz | 3, 4, 5, and 6 |
| 28 | 8.64 GHz | 4, 5, 6, and 7 |

Figure 4:
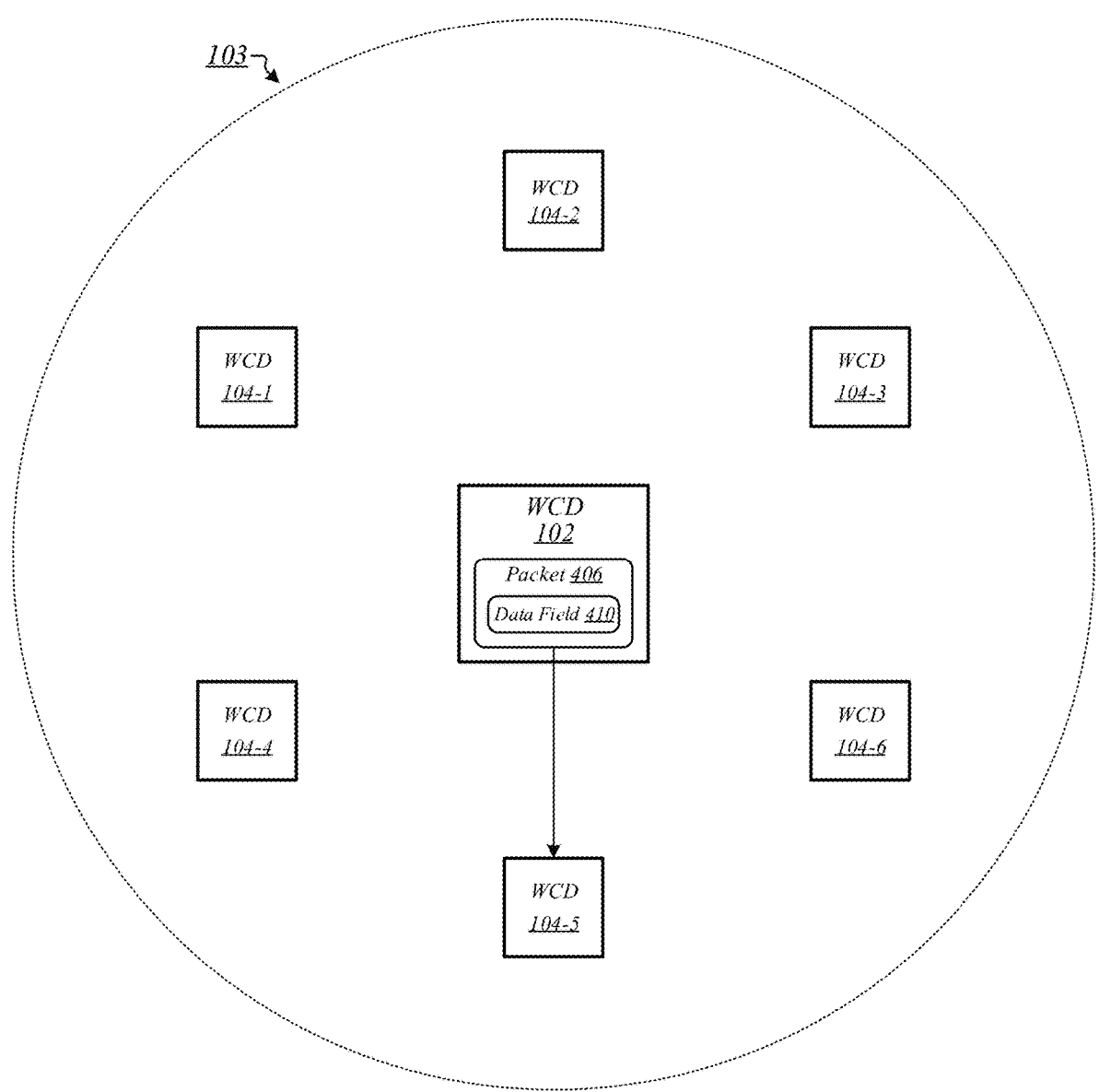
FIG. 4 illustrates an embodiment of a second operating environment.

FIG. 4 illustrates an example of an operating environment 400 such as may be representative of various embodiments. In operating environment 400, wireless communication device 102 may identify data that is to be provided to wireless communication device 104-5. In order to provide that data to wireless communication device 104-5, wireless communication device 102 may encapsulate it within a packet 406 and transmit the packet 406 to wireless communication device 104-5. In various embodiments, packet 406 may comprise a physical layer convergence protocol (PLCP) protocol data unit (PPDU). In some embodiments, packet 406 may comprise a data field 410 that contains the data to be provided to wireless communication device 104-5.

In operating environment 400, devices in wireless network 103 may wirelessly communicate in accordance with a protocol that defines various different data transmission procedures, each of which may correspond to a different scheme for transmitting a packet via channel(s) defined by a channelization scheme such as channelization scheme 200 of FIG. 2 or channelization scheme 300 of FIG. 3. According to any given one of such data transmission procedures, one or more 2.16 GHz base channels may be used to convey a data field of a transmitted packet, and may be referred to as the data transmission channel(s) with respect to transmission of that packet. In various embodiments, the data transmission procedures defined by the protocol may include a base channel data transmission procedure, a wide channel data transmission procedure, and an aggregated carrier data transmission procedure. Transmission of a packet according to the base channel data transmission procedure may alternatively be referred to as transmission of that packet in "base channel mode." Likewise, packet transmission according to the wide channel data transmission procedure may alternatively be referred to as packet transmission in "wide channel mode," and packet transmission according to the aggregated carrier data transmission procedure may alternatively be referred to as transmission of that packet in "aggregated carrier mode."

In some embodiments, transmission of a packet in base channel mode may involve transmitting a data field of that packet using a single data transmission channel. For example, if wireless network 103 implements channelization scheme 200 of FIG. 2 and wireless communication device 102 transmits packet 406 in base channel mode, then it may transmit data field 410 via a single data transmission channel comprising one of base channels 1, 2, 3, 4, 5, and 6. The embodiments are not limited to this example.

In various embodiments, transmission of a packet in wide channel mode may involve transmitting a data field of that packet via a wide channel corresponding to a bonded set of two or more 2.16 GHz base channels. In this context, the two or more 2.16 GHz base channels being bonded would constitute the data transmission channels with respect to transmission of the packet. For example, if wireless network 103 implements channelization scheme 300 of FIG. 3, and wireless communication device 102 transmits packet 406 in wide channel mode using 2.16 GHz base channels 5, 6, 7, and 8 as data transmission channels, then it may transmit data field 410 via 8.64 GHz channel 29. The embodiments are not limited to this example.

In some embodiments, transmission of a packet in aggregated carrier mode may involve conveying a data field of that packet via an aggregated set of two or more 2.16 GHz base channels. In this context, the two or more 2.16 GHz base channels being aggregated would constitute the data transmission channels with respect to transmission of the packet. Unlike transmission in wide channel mode, which may involve performing a single modulation across the combined bandwidth of multiple data transmission channels ("the bonded channel set"), transmission in aggregated carrier mode may involve separate parallel modulations of each of multiple data transmission channels ("the aggregated channel set"). Transmission of a packet in aggregated carrier mode using two data transmission channels may also be referred to as transmission of that packet in "2.16 GHz+2.16 GHz" mode. In an example of an embodiment involving transmission in aggregated carrier mode (and more particularly, 2.16 GHz+2.16 GHz mode), wireless network 103 may implement channelization scheme 300 of FIG. 3, and wireless communication device 102 may perform separate modulations of 2.16 GHz base channels 5 and 7 in parallel in order to convey data field 410. In the context of this example, 2.16 GHz base channels 5 and 7 would constitute the data transmission channels with respect to transmission of packet 406. The embodiments are not limited to this example.

In various embodiments, in preparation for transmission of packet 406 to wireless communication device 104-5, wireless communication device 102 may be operative to determine a channel usage configuration that is to be applied for transmission of packet 406. In some embodiments, the applicable channel usage configuration for transmission of packet 406 may designate an amount of bandwidth that is to be occupied in conjunction with transmission of packet 406. In the context of that transmission, the designated amount of bandwidth may be referred to as the "occupied bandwidth." In various embodiments, the applicable channel usage configuration may specify a data transmission procedure according to which packet 406 is to be transmitted. In some embodiments, the applicable channel usage configuration may designate one or more 2.16 GHz base channels that are to serve as data transmission channels in the context of the transmission of packet 406 in the specified data transmission mode.

In various embodiments, the applicable channel usage configuration may also designate a particular 2.16 GHz base channel as a primary channel in the context of the transmission of packet 406. In some embodiments, devices in wireless network 103 may communicate according to a protocol that requires that the primary channel be a base channel that corresponds to a portion of wireless spectrum that is modulated in conjunction with transmission of data field 410—in other words, that the primary channel also serve as a data transmission channel. A primary channel of this type may be referred to as an "in-band" primary channel. In embodiments in which only in-band primary channels are permitted, the applicable channel usage configuration may designate a particular data transmission channel as the primary channel. In various other embodiments, a protocol governing communications between devices in wireless network 103 may permit the primary channel to correspond to a portion of wireless spectrum that is not modulated in conjunction with transmission of data field 410. A primary channel of this type may be referred to as an "out-of-band" primary channel. In embodiments in which both in-band and out-of-band primary channels are permitted, the primary channel designated by the applicable channel usage configuration may or may not be a data transmission channel. The embodiments are not limited in this context.

In operating environment 400, in order to successfully receive packet 406 and obtain the data comprised in data field 410, wireless communication device 104-5 may require knowledge of various aspects of the channel usage configuration, such as the applicable data transmission mode, the identities of the primary channel and data transmission channel(s), and the occupied bandwidth. In some embodiments, a wireless communication protocol implemented in wireless network 103 may define a notification mechanism via which devices in wireless network 103 may be informed of such parameters. In order to optimize wireless communication performance within wireless network 103, it may be desirable that the notification mechanism be designed such that it makes this information available to devices in wireless network 103 at a relatively low cost in terms of added overhead.

Disclosed herein are parameter encoding techniques that may be implemented in various embodiments in order to enable devices such as wireless communication device 102 to notify other devices of channel usage configuration parameters in a manner involving relatively little overhead. According to some such techniques, a wireless communication network such as wireless communication network 103 may implement a wireless communication protocol that defines a notification mechanism according to which a wireless communication device such as wireless communication device 102 may use information elements such as index values and/or bitmaps to specify channel usage configuration parameters associated with its transmissions. In various embodiments, the wireless communication device may include such information elements in PHY headers of transmitted packets in order to notify receiving devices of channel usage configuration parameters associated with those packets. The embodiments are not limited in this context.

Figure 5:
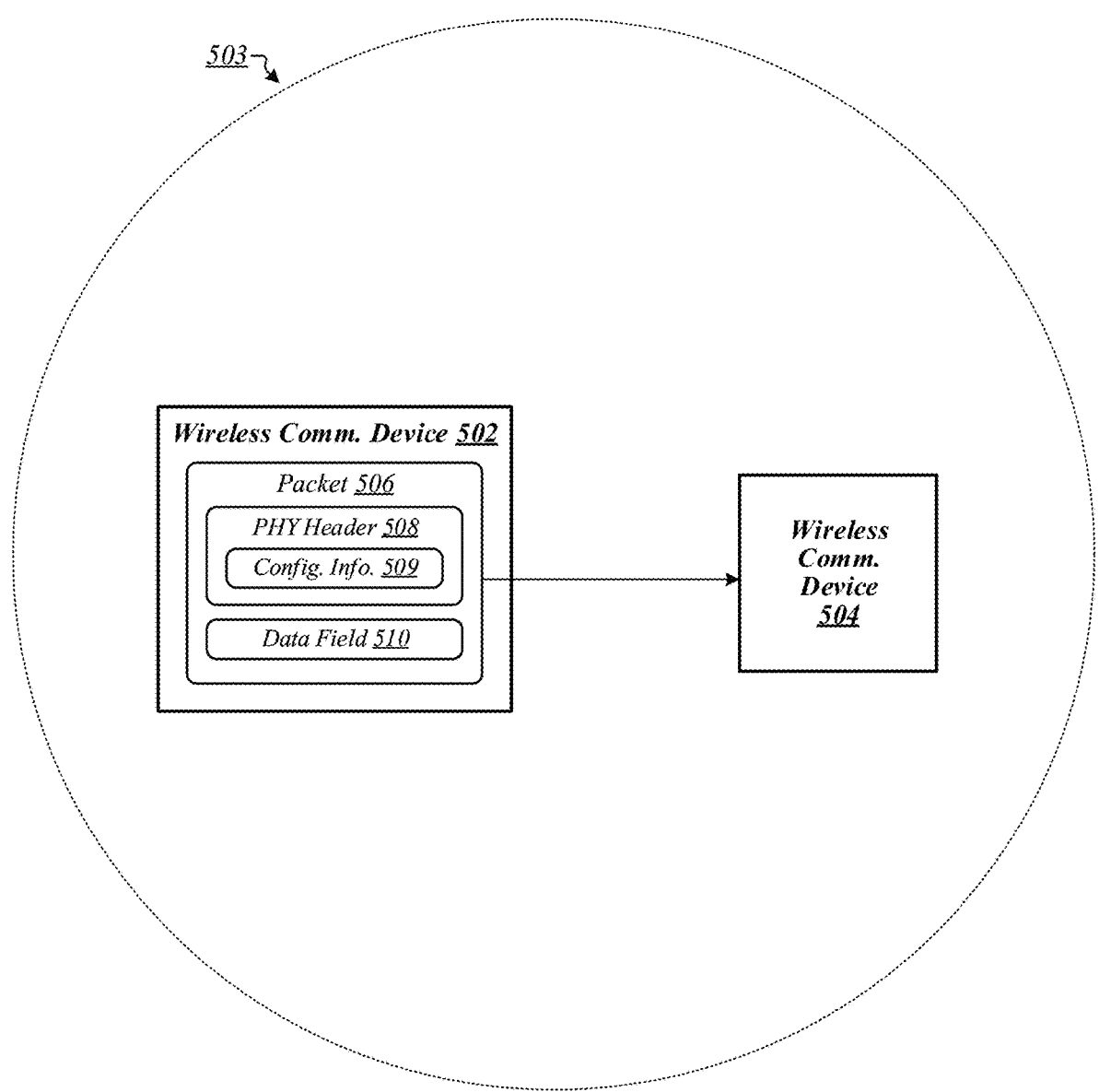
FIG. 5 illustrates an embodiment of a third operating environment.

FIG. 5 illustrates an example of an operating environment 500 that may be representative of the implementation of one or more of the disclosed parameter encoding techniques according to various embodiments. In operating environment 500, a wireless network 503 may implement a protocol that defines a notification mechanism according to which transmitting devices inform other devices of channel usage configuration parameters associated with transmitted packets by including configuration information within PHY headers of those packets. Using one or more wireless communication channels of wireless network 503, a wireless communication device 502 may wirelessly communicate with a wireless communication device 504.

In various embodiments, wireless network 503 may comprise a wireless network that utilizes wireless channel frequencies of the 60 GHz band. In some embodiments, wireless communication devices 502 and 504 may be operative to wirelessly communicate with each other according to one or more standards for 60 GHz wireless communications. In various embodiments, wireless communication devices 502 and 504 may be operative to wirelessly communicate with each other according to one or more protocols and/or procedures defined in IEEE 802.11ad-2012, and/or predecessors, revisions, progeny, and/or variants thereof. In some embodiments, wireless communication devices 502 and 504 may be operative to wirelessly communicate with each other according to one or more protocols and/or procedures defined in one or more standards developed by IEEE 802.11 Task Group ay (TGay). In some embodiments, wireless communication devices 502 and 504 may comprise 60 GHz-capable STAs, such as DMG STAs or EDMG STAs. In various embodiments, wireless communication device 502 may operate as a PCP/AP, and wireless communication device 504 may operate as a non-PCP/AP STA. In various other embodiments, wireless communication device 504 may operate as a PCP/AP, and wireless communication device 502 may operate as a non-PCP/AP STA. In yet other embodiments, wireless communication devices 502 and 504 may both operate as non-PCP/AP STAs. The embodiments are not limited in this context.

In operating environment 500, having identified data to be provided to wireless communication device 504, wireless communication device 502 include that data in a data field 510 of a packet 506 that it transmits to wireless communication device 504. Wireless communication device 502 may notify wireless communication device 504 of various channel usage configuration parameters applicable to transmission of packet 506 by including configuration information 509 in a PHY header 508 of packet 506. Based on configuration information 509, wireless communication device 504 may identify the applicable channel usage configuration, enabling it to successfully receive packet 506 and obtain the data contained in data field 510.

Figure 6:
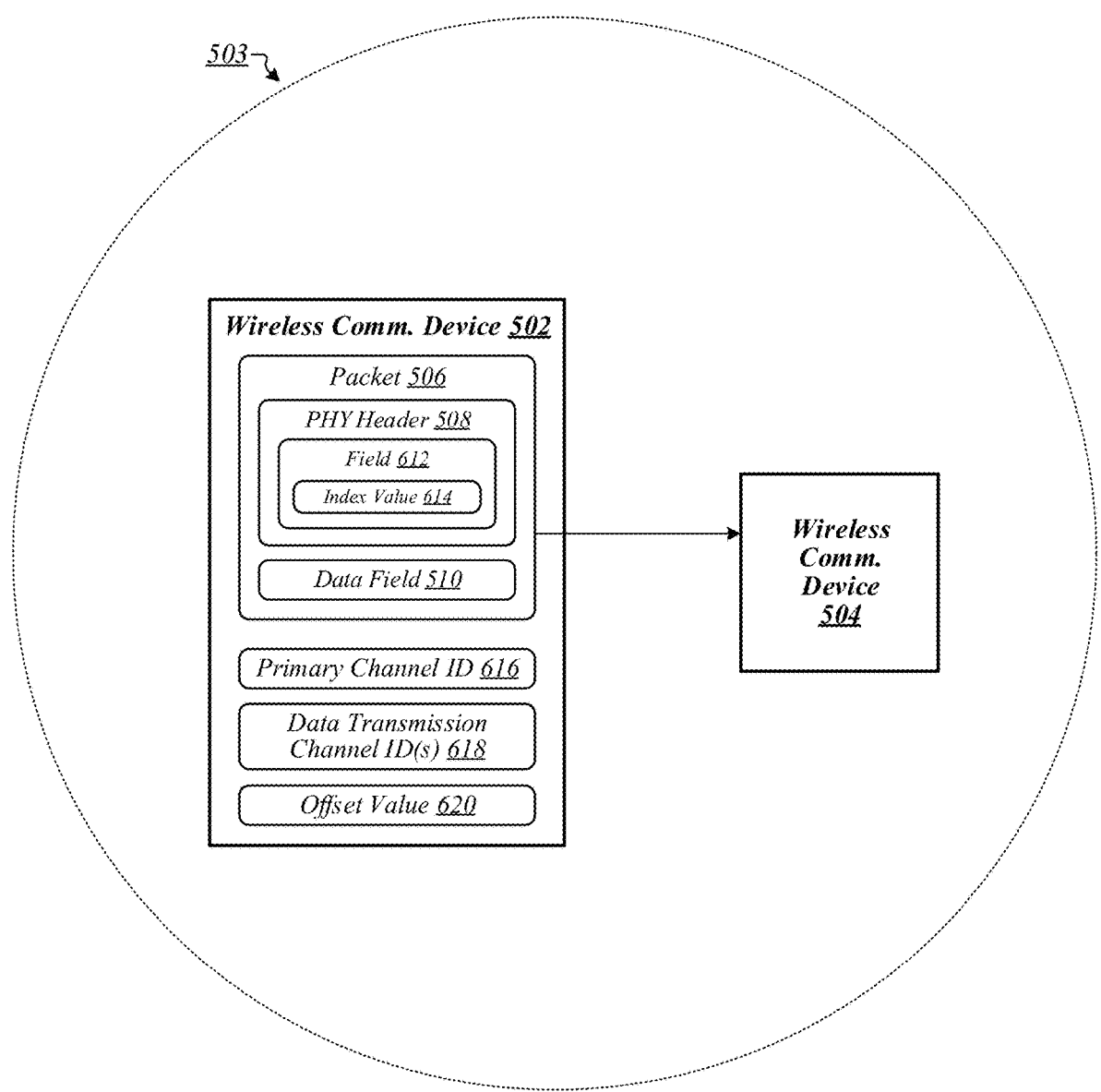
FIG. 6 illustrates an embodiment of a fourth operating environment.

FIG. 6 illustrates an example of an operating environment 600 that may be representative of the implementation of one or more of the disclosed parameter encoding techniques according to various embodiments. More particularly, operating environment 600 may be representative of various embodiments in which configuration information 509 of FIG. 5 is provided in the form of a single index value 614. In some embodiments, index value 614 may uniquely identify a particular combination of channel usage configuration parameters. In various embodiments, for example, index value 614 may uniquely identify a particular combination of occupied bandwidth, data transmission mode (such as base channel mode, wide channel mode, or aggregated carrier mode), primary channel, and data transmission channel(s). In some embodiments, index value 614 may be comprised in a field 612, which may comprise a size (in bits) enabling the conveyance of each of a number of unique values that is at least as large as a number of different permissible combinations of channel usage configuration parameters.

In various embodiments, devices in wireless network 503 may communicate according to a protocol that implements channelization scheme 200 of FIG. 2 and permits out-of-band (OOB) primary channels. In such embodiments, if overlap between wide channels is not permitted, there may be a total of 104 possible combinations (listed in Table 5) of occupied bandwidth, data transmission channel(s), and primary channel. In order to accommodate this number of possible combinations, field 612 may comprise a length of at least 7 bits. It is worthy of note that in embodiments in which overlap between wide channels is permitted, there may be a greater number of possible combinations, potentially necessitating that field 612 comprise more than 7 bits. The embodiments are not limited in this context.

TABLE 5

| Occupied BW | Pr. Ch. Type | Data Tx Mode | Possible (DTC(s))$_{PC}$ Combinations | No. of Comb'ns |
|---|---|---|---|---|
| 2.16 GHz | in-band | BC | $(1)_1$, $(2)_2$, $(3)_3$, $(4)_4$, $(5)_5$, $(6)_6$ | 6 |
| 4.32 GHz | in-band | WC | $(1 \cdot 2)_1$, $(1 \cdot 2)_2$, $(3 \cdot 4)_3$, $(3 \cdot 4)_4$, $(5 \cdot 6)_5$, $(5 \cdot 6)_6$ | 6 |
|  |  | AC | $(1|2)_1$, $(1|2)_2$, $(1|3)_1$, $(1|3)_3$, $(1|4)_1$, $(1|4)_4$, $(1|5)_1$, $(1|5)_5$, $(1|6)_1$, $(1|6)_6$, $(2|3)_2$, $(2|3)_3$, $(2|4)_2$, $(2|4)_4$, $(2|5)_2$, $(2|5)_5$, $(2|6)_2$, $(2|6)_6$, $(3|4)_3$, $(3|4)_4$, $(3|5)_3$, $(3|5)_5$, $(3|6)_3$, $(3|6)_6$, $(4|5)_4$, $(4|5)_5$, $(4|6)_4$, $(4|6)_6$, $(5|6)_5$, $(5|6)_6$ | 30 |
|  | OOB | BC | $(1)_2$, $(2)_1$, $(3)_4$, $(4)_3$, $(5)_6$, $(6)_5$ | 6 |
| 6.48 GHz | in-band | WC | $(1 \cdot 2 \cdot 3)_1$, $(1 \cdot 2 \cdot 3)_2$, $(1 \cdot 2 \cdot 3)_3$, $(4 \cdot 5 \cdot 6)_4$, $(4 \cdot 5 \cdot 6)_5$, $(4 \cdot 5 \cdot 6)_6$ | 6 |
|  | OOB | WC | $(1 \cdot 2)_3$, $(2 \cdot 3)_1$, $(4 \cdot 5)_6$, $(5 \cdot 6)_4$ | 4 |
|  |  | AC | $(1|3)_2$, $(4|6)_5$ | 2 |
|  |  | BC | $(1)_2$, $(1)_3$, $(2)_1$, $(2)_3$, $(3)_1$, $(3)_2$, $(4)_5$, $(4)_6$, $(5)_4$, $(5)_6$, $(6)_4$, $(6)_5$ | 12 |
| 8.64 GHz | in-band | WC | $(1 \cdot 2 \cdot 3 \cdot 4)_1$, $(1 \cdot 2 \cdot 3 \cdot 4)_2$, $(1 \cdot 2 \cdot 3 \cdot 4)_3$, $(1 \cdot 2 \cdot 3 \cdot 4)_4$ | 4 |
|  | OOB | WC | $(1 \cdot 2 \cdot 3)_4$, $(2 \cdot 3 \cdot 4)_1$, $(1 \cdot 2)_3$, $(1 \cdot 2)_4$, $(2 \cdot 3)_1$, $(2 \cdot 3)_4$, $(3 \cdot 4)_1$, $(3 \cdot 4)_2$ | 8 |
|  |  | AC | $(1|2)_3$, $(1|2)_4$, $(1|3)_2$, $(1|3)_4$, $(1|4)_2$, $(1|4)_3$, $(2|3)_1$, $(2|3)_4$, $(2|4)_1$, $(2|4)_3$, $(3|4)_1$, $(3|4)_2$ | 12 |
|  |  | BC | $(1)_3$, $(1)_4$, $(2)_3$, $(2)_4$, $(3)_1$, $(3)_2$, $(4)_1$, $(4)_2$ | 8 |
|  |  | TOTAL POSSIBLE COMBINATIONS: |  | 104 |

In some embodiments, devices in wireless network 503 may communicate according to a protocol that implements channelization scheme 300 of FIG. 3 and permits out-of-band (OOB) primary channels. In such embodiments, if overlap between wide channels is not permitted, there may be a total of 168 possible combinations (listed in Table 6) of occupied bandwidth, data transmission channel(s), and primary channel. In order to accommodate this number of possible combinations, field 612 may comprise a length of at least 8 bits. It is worthy of note that in embodiments in which overlap between wide channels is permitted, there may be a greater number of possible combinations, potentially necessitating that field 612 comprise more than 8 bits. The embodiments are not limited in this context.

TABLE 6

| Occupied BW | Pr. Ch. Type | Data Tx Mode | Possible $(DTC(s))_{PC}$ Combinations | No. of Comb'ns |
|---|---|---|---|---|
| 2.16 GHz | in-band | BC | $(1)_1, (2)_2, (3)_3, (4)_4, (5)_5, (6)_6, (7)_7, (8)_8$ | 8 |
| 4.32 GHz | in-band | WC | $(1\cdot2)_1, (1\cdot2)_2, (3\cdot4)_3, (3\cdot4)_4, (5\cdot6)_5, (5\cdot6)_6, (7\cdot8)_7, (7\cdot8)_8$ | 8 |
| | | AC | $(1|2)_1, (1|2)_2, (1|3)_1, (1|3)_3, (1|4)_1, (1|4)_4, (1|5)_1, (1|5)_5, (1|6)_1, (1|6)_6,$ $(1|7)_1, (1|7)_7, (1|8)_1, (1|8)_8, (2|3)_2, (2|3)_3, (2|4)_2, (2|4)_4, (2|5)_2, (2|5)_5,$ $(2|6)_2, (2|6)_6, (2|7)_2, (2|7)_7, (2|8)_2, (2|8)_8, (3|4)_3, (3|4)_4, (3|5)_3, (3|5)_5,$ $(3|6)_3, (3|6)_6, (3|7)_3, (3|7)_7, (3|8)_3, (3|8)_8, (4|5)_4, (4|5)_5, (4|6)_4, (4|6)_6,$ $(4|7)_4, (4|7)_7, (4|8)_4, (4|8)_8, (5|6)_5, (5|6)_6, (5|7)_5, (5|7)_7, (5|8)_5, (5|8)_8,$ $(6|7)_6, (6|7)_7, (6|8)_6, (6|8)_8, (7|8)_7, (7|8)_8$ | 56 |
| | OOB | BC | $(1)_2, (2)_1, (3)_4, (4)_3, (5)_6, (6)_5, (7)_8, (8)_7$ | 8 |
| 6.48 GHz | in-band | WC | $(1\cdot2\cdot3)_1, (1\cdot2\cdot3)_2, (1\cdot2\cdot3)_3, (5\cdot6\cdot7)_5, (5\cdot6\cdot7)_6, (5\cdot6\cdot7)_7$ | 6 |
| | OOB | WC | $(1\cdot2)_3, (2\cdot3)_1, (5\cdot6)_7, (6\cdot7)_5$ | 4 |
| | | AC | $(1|3)_2, (5|7)_6$ | 2 |
| | | BC | $(1)_2, (1)_3, (2)_1, (2)_3, (3)_1, (3)_2, (5)_6, (5)_7, (6)_5, (6)_7, (7)_5, (7)_6$ | 12 |
| 8.64 GHz | in-band | WC | $(1\cdot2\cdot3\cdot4)_1, (1\cdot2\cdot3\cdot4)_2, (1\cdot2\cdot3\cdot4)_3, (1\cdot2\cdot3\cdot4)_4, (5\cdot6\cdot7\cdot8)_5, (5\cdot6\cdot7\cdot8)_6,$ $(5\cdot6\cdot7\cdot8)_7, (5\cdot6\cdot7\cdot8)_8$ | 8 |
| | OOB | WC | $(1\cdot2\cdot3)_4, (2\cdot3\cdot4)_1, (1\cdot2)_3, (1\cdot2)_4, (2\cdot3)_1, (2\cdot3)_4, (3\cdot4)_1, (3\cdot4)_2, (5\cdot6\cdot7)_8,$ $(6\cdot7\cdot8)_5, (5\cdot6)_7, (5\cdot6)_8, (6\cdot7)_5, (6\cdot7)_8, (7\cdot8)_5, (7\cdot8)_6$ | 16 |
| | | AC | $(1|2)_3, (1|2)_4, (1|3)_2, (1|3)_4, (1|4)_2, (1|4)_3, (2|3)_1, (2|3)_4, (2|4)_1, (2|4)_3,$ $(3|4)_1, (3|4)_2, (5|6)_7, (5|6)_8, (5|7)_6, (5|7)_8, (5|8)_6, (5|8)_7, (6|7)_5, (6|7)_8,$ $(6|8)_5, (6|8)_7, (7|8)_5, (7|8)_6$ | 24 |
| | | BC | $(1)_3, (1)_4, (2)_3, (2)_4, (3)_1, (3)_2, (4)_1, (4)_2, (5)_7, (5)_8, (6)_7, (6)_8, (7)_5, (7)_6,$ $(8)_5, (8)_6$ | 16 |
| | | | TOTAL POSSIBLE COMBINATIONS: | 168 |

In some embodiments, wireless communication device 502 may generally be operative to identify index value 614 based on a mapping scheme according to which respective index values are mapped to various possible channel usage configurations. In some embodiments, in order to enable application of such a mapping scheme, wireless communication device 502 may be operative to determine a primary channel identifier (ID) 616 and one or more data transmission channel ID(s) 618. Primary channel ID 616 may comprise a channel ID associated with the primary channel designated by the applicable channel usage configuration. Data transmission channel ID(s) 618 may comprise one or more channel IDs, each one of which may comprise a channel ID associated with a respective one of the one or more data transmission channels designated by the applicable channel usage configuration.

In various embodiments, wireless communication device 502 may apply a mapping scheme to identify index value 614 based on primary channel ID 616 and transmission channel ID(s) 618. In some such embodiments, wireless communication device 502 may determine an offset value 620 based on the occupied bandwidth and the data transmission mode, and may identify index value 614 based on primary channel ID 616, transmission channel ID(s) 618, and offset value 620. The embodiments are not limited in this context.

In various embodiments, wireless communication device 504 may identify the index value 614 comprised in field 612, and may then identify a channel usage configuration that corresponds to that index value 614. In some embodiments, wireless communication device 504 may then apply the identified channel usage configuration for reception of data field 510. In various embodiments, based on index value 614, wireless communication device 504 may determine primary channel ID 616 and data transmission channel ID(s) 618. In some embodiments, based on index value 614, wireless communication device 504 may identify an occupied bandwidth and/or a data transmission mode associated with transmission of packet 506. The embodiments are not limited in this context.

Figure 7:
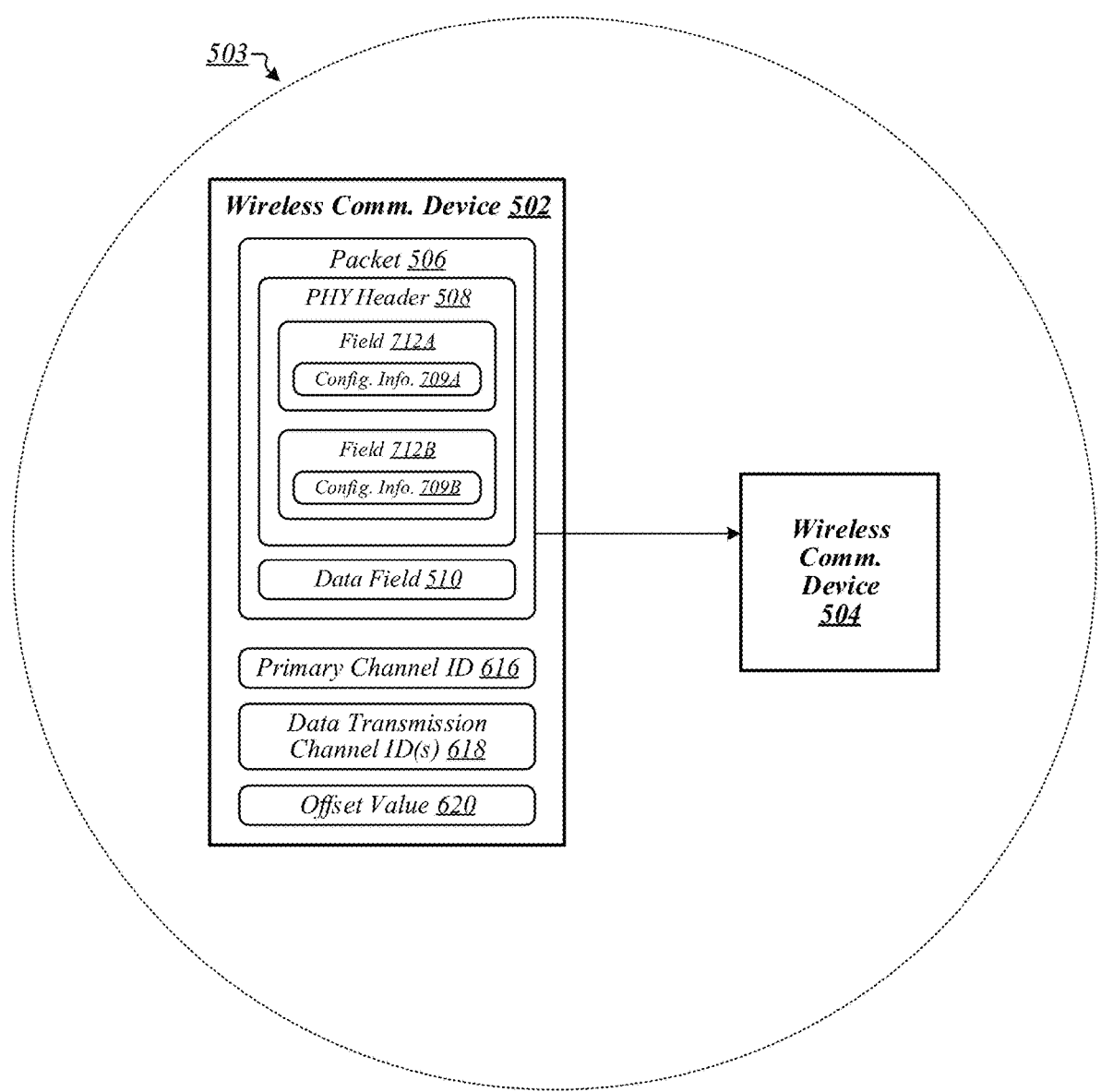
FIG. 7 illustrates an embodiment of a fifth operating environment.

FIG. 7 illustrates an example of an operating environment 700 that may be representative of the implementation of one or more of the disclosed parameter encoding techniques according to various embodiments. More particularly, operating environment 700 may be representative of various embodiments in which two fields are used to provide wireless communication device 504 with configuration information for use in identifying the applicable channel usage configuration for packet 506. In operating environment 700, wireless communication device 502 may include configuration information 709A in a field 712A of PHY header 508, and may include configuration information 709B in a field 712B of PHY header 508. In some embodiments, configuration information 709A may comprise information identifying the data transmission channel(s) with respect to transmission of packet 506, and configuration information 709B may comprise information identifying the primary channel for that transmission. In various embodiments, configuration information 709B may comprise a three-bit value indicating a 2.16 GHz base channel that comprises the primary channel. The embodiments are not limited in this context.

In some embodiments, configuration information 709A may take the form of an index value of a similar nature as index value 614. In various such embodiments, the use of separate field 712B to convey configuration information 709B indicating the identity of the primary channel may reduce the number of different possible index values that need to be accommodated by field 712A (relative to field 612 in operating environment 600 of FIG. 6). For example, if devices in wireless network 503 communicate according to a protocol that implements channelization scheme 200 of FIG. 2 and wide channel overlap is not permitted, then field 712A may only need to accommodate 27 different possible index values instead of 104, and may thus be implemented using only 5 bits instead of 7. Similarly, if devices in wireless network 503 communicate according to a protocol that implements channelization scheme 300 of FIG. 3 and wide channel overlap is not permitted, then field 712B may only need to accommodate 44 different possible index values instead of 168, and may thus be implemented using only 6 bits instead of 8. The embodiments are not limited to these examples.

In some embodiments, rather than comprising an index value, the configuration information 709A in field 712A may comprise a bitmap. In various embodiments, each bit of the bitmap may be set to indicate whether a respective 2.16 GHz base channel constitutes a data transmission channel with respect to transmission of packet 506. In some embodiments, field 712A may contain a 6-bit bitmap, each bit of which may correspond to a respective one of 2.16 GHz base channels 1-6 of channelization scheme 200 of FIG. 2. In various embodiments, field 712A may contain an 8-bit bitmap, each bit of which may correspond to a respective one of 2.16 GHz base channels 1-8 of channelization scheme 300 of FIG. 3. In some embodiments, PHY header 508 may include a bit set to indicate whether packet 506 is being transmitted in aggregated carrier mode. In various embodiments, in the event that a bitmap in field 712A indicates the use of multiple contiguous 2.16 GHz base channels, the inclusion of such a bit may enable wireless communication device 504 to determine whether those contiguous channels are being bonded or aggregated in conjunction with transmission of packet 506. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
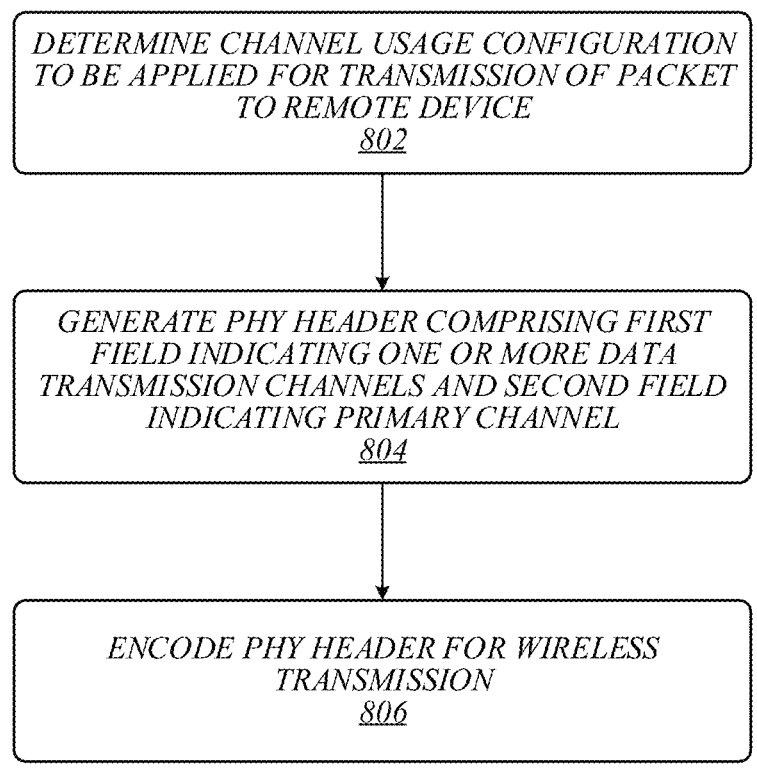
FIG. 8 illustrates an embodiment of a first logic flow.

FIG. 8 illustrates an example of a logic flow 800 that may be representative of operations that may be performed according to one or more of the disclosed parameter encoding techniques in various embodiments. For example, logic flow 800 may be representative of operations that may be performed by wireless communication device 502 in operating environment 500 of FIG. 5 according to some embodiments. As shown in FIG. 8, a channel usage configuration that is to be applied for transmission of a packet to a remote device may be determined at 802. For example, in operating environment 700 of FIG. 7, wireless communication device 502 may determine a channel usage configuration that is to be applied for transmission of packet 506 to wireless communication device 504. At 804, a PHY header of the packet may be generated, and the PHY header may comprise a first field indicating one or more data transmission channels and a second field indicating a primary channel. For example, in operating environment 700 of FIG. 7, wireless communication device 502 may generate PHY header 508, which may comprise a field 712A containing configuration information 709A indicating one or more data transmission channels, and a field 712B containing configuration information 709B indicating a primary channel. At 806, the PHY header may be encoded for wireless transmission. For example, in operating environment 700 of FIG. 7, wireless communication device 502 may encode PHY header 508 for wireless transmission to wireless communication device 504. The embodiments are not limited to these examples.

Figure 9:
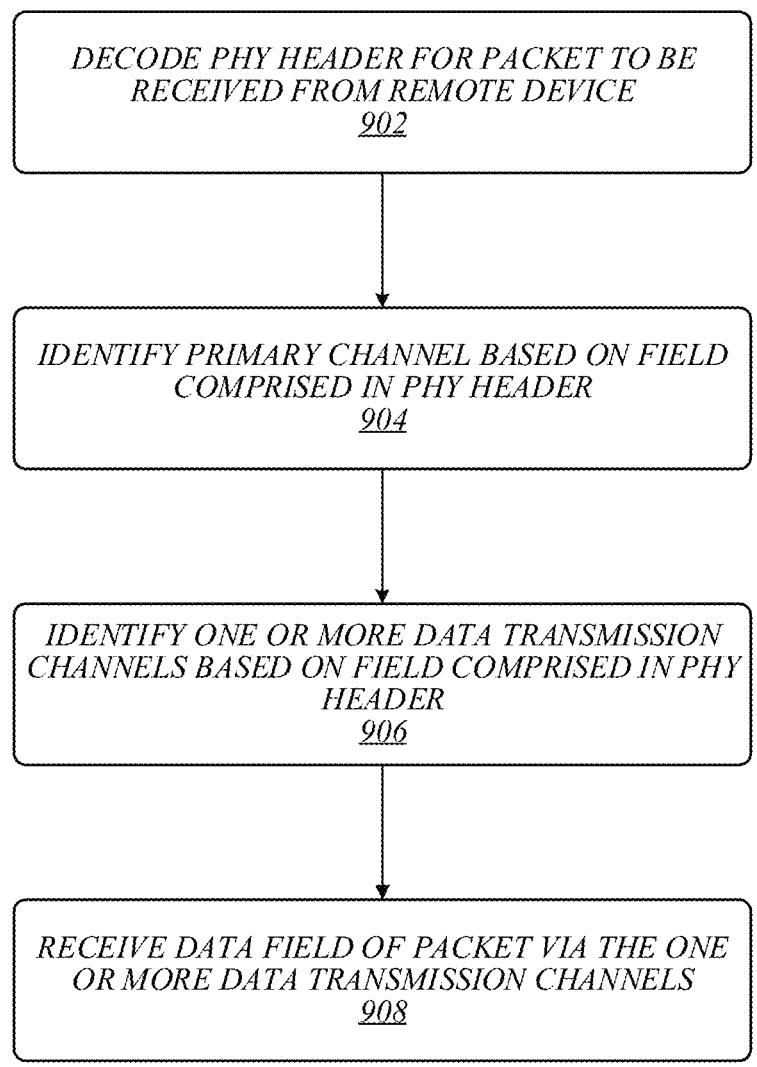
FIG. 9 illustrates an embodiment of a second logic flow.

FIG. 9 illustrates an example of a logic flow 900 that may be representative of operations that may be performed according to one or more of the disclosed parameter encoding techniques in various embodiments. For example, logic flow 900 may be representative of operations that may be performed by wireless communication device 504 in operating environment 700 of FIG. 7 according to some embodiments. As shown in FIG. 9, a PHY header for a packet to be received from a remote device may be decoded at 902. For example, in operating environment 700 of FIG. 7, wireless communication device 504 may decode the PHY header 508 of packet 506. At 904, a primary channel may be identified based on a field comprised in the PHY header. For example, in operating environment 700 of FIG. 7, wireless communication device 504 may identify the primary channel based on configuration information 709B comprised in field 712B of PHY header 508. At 906, one or more data transmission channels may be identified based on a field comprised in the PHY header. For example, in operating environment 700 of FIG. 7, wireless communication device 504 may identify one or more data transmission channels based on configuration information 709A comprised in field 712A of PHY header 508. At 908, a data field of the packet may be received via the one or more data transmission channels. For example, in operating environment 700 of FIG. 7, wireless communication device 504 may receive data field 510 via one or more data transmission channels identified based on configuration information 709A comprised in field 712A of PHY header 508. The embodiments are not limited to these examples.

Various embodiments of the invention may be implemented fully or partially in software and/or firmware. This software and/or firmware may take the form of instructions contained in or on a computer-readable storage medium, which may comprise a non-transitory storage medium according to some embodiments. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may generally comprise any medium suitable for storing information in a form readable by one or more computers, such as but not limited to read only memory (ROM); random access memory (RAM); magnetic disk storage media; optical storage media; a flash memory, etc. The embodiments are not limited in this context.

Figure 10A:
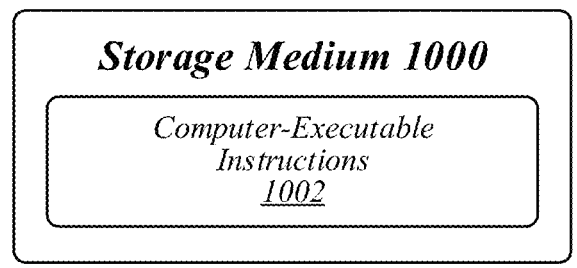
FIG. 10A illustrates an embodiment of a first storage medium.

FIG. 10A illustrates an embodiment of a storage medium 1000. Storage medium 1000 may comprise any computer-readable storage medium or machine-readable storage medium, such as an optical, magnetic or semiconductor storage medium. In various embodiments, storage medium 1000 may comprise an article of manufacture. In some embodiments, storage medium 1000 may comprise a non-transitory storage medium. In some embodiments, storage medium 1000 may store computer-executable instructions 1002 that generally comprise instructions for implementing one or more of the disclosed parameter encoding techniques. In various embodiments, computer-executable instructions 1002 may include instructions for implementing one or both of wireless communication device 102 and wireless communication device 502. In some embodiments, computer-executable instructions 1002 may include instructions for implementing any of wireless communication devices 104-1 to 104-6 and/or wireless communication device 504. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10B:
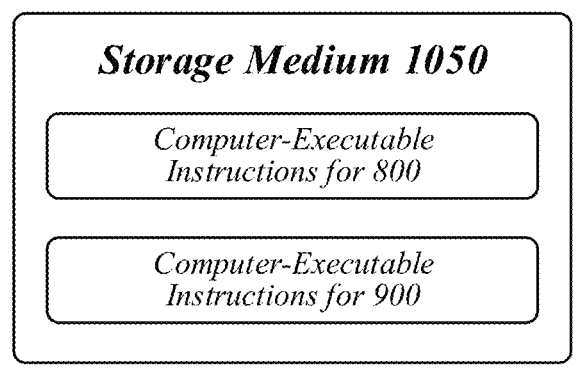
FIG. 10B illustrates an embodiment of a second storage medium.

FIG. 10B illustrates an embodiment of a storage medium 1050. Storage medium 1050 may comprise any computer-readable storage medium or machine-readable storage medium, such as an optical, magnetic or semiconductor storage medium. In various embodiments, storage medium 1050 may comprise an article of manufacture. In some embodiments, storage medium 1050 may comprise a non-transitory storage medium. In some embodiments, storage medium 1000 may store computer-executable instructions, such as computer-executable instructions to implement one or both of logic flows 800 and 900. Examples of a computer-readable storage medium or machine-readable storage medium and of computer-executable instructions may include any of the respective examples discussed above in reference to storage medium 1000 of FIG. 10A. The embodiments are not limited in this context.

Figure 11:
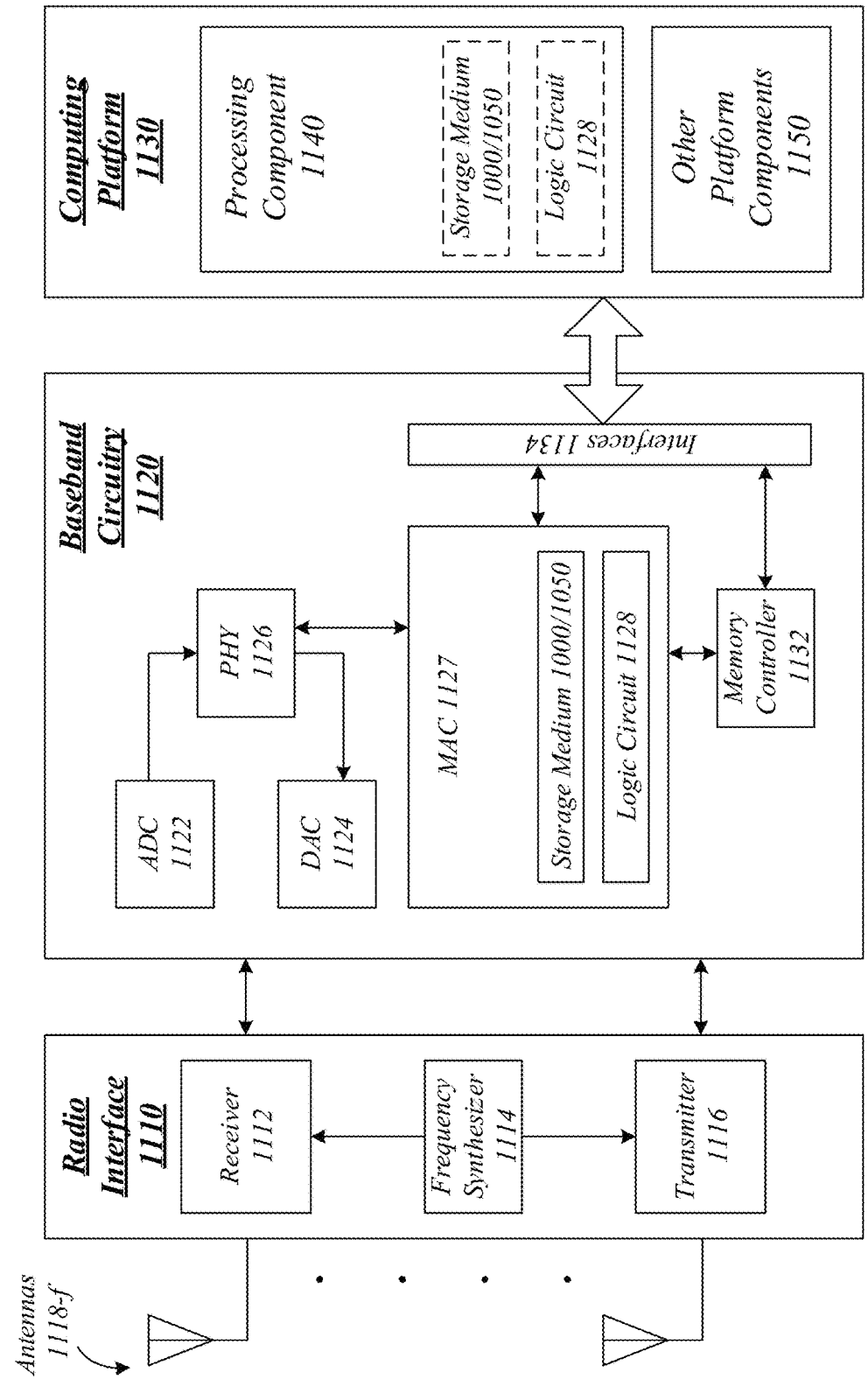
FIG. 11 illustrates an embodiment of a device.

FIG. 11 illustrates an embodiment of a communications device 1100 that may implement one or more of wireless communication device 102, wireless communication devices 104-1 to 104-6, wireless communication device 502, wireless communication device 504, logic flow 800, logic flow 900, storage medium 1000, and storage medium 1050 according to various embodiments. In various embodiments, device 1100 may comprise a logic circuit 1128. The logic circuit 1128 may include physical circuits to perform operations described for one or more of wireless communication device 102, wireless communication devices 104-1 to 104-6, wireless communication device 502, wireless communication device 504, logic flow 800, and logic flow 900, for example. As shown in FIG. 11, device 1100 may include a radio interface 1110, baseband circuitry 1120, and computing platform 1130, although the embodiments are not limited to this configuration.

The device 1100 may implement some or all of the structure and/or operations for one or more of wireless communication device 102, wireless communication devices 104-1 to 104-6, wireless communication device 502, wireless communication device 504, logic flow 800, logic flow 900, storage medium 1000, storage medium 1050, and logic circuit 1128 in a single computing entity, such as entirely within a single device. Alternatively, the device 1100 may distribute portions of the structure and/or operations for one or more of wireless communication device 102, wireless communication devices 104-1 to 104-6, wireless communication device 502, wireless communication device 504, logic flow 800, logic flow 900, storage medium 1000, storage medium 1050, and logic circuit 1128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1110 may include, for example, a receiver 1112, a frequency synthesizer 1114, and/or a transmitter 1116. Radio interface 1110 may include bias controls, a crystal oscillator and/or one or more antennas 1118-$f$. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of wireless communication device 102, wireless communication devices 104-1 to 104-6, wireless communication device 502, wireless communication device 504, logic flow 800, logic flow 900, storage medium 1000, storage medium 1050, and logic circuit 1128 using the processing component 1140. The processing component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 12:
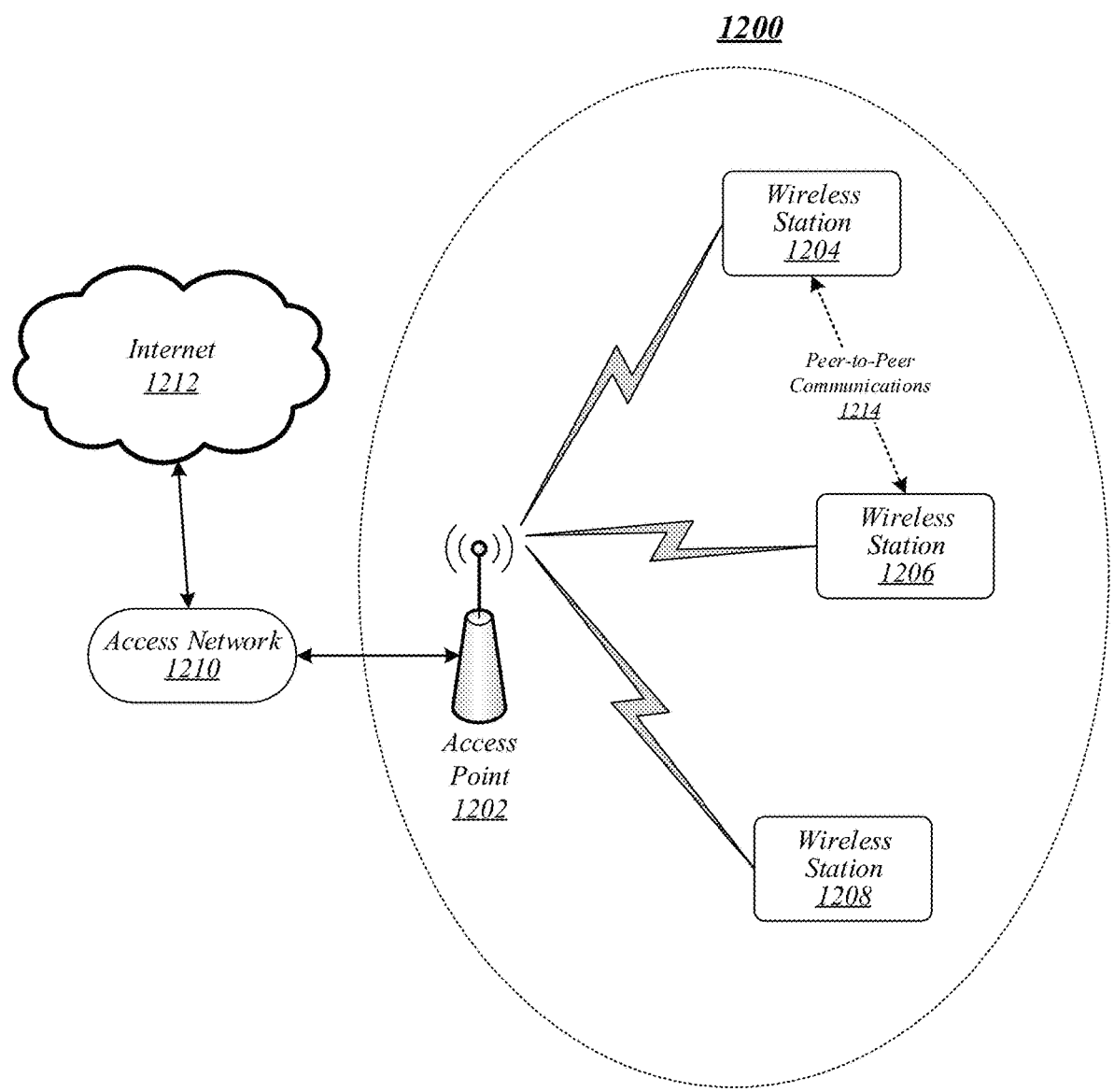
FIG. 12 illustrates an embodiment of a wireless network.

FIG. 12 illustrates an embodiment of a wireless network 1200. As shown in FIG. 12, wireless network comprises an access point 1202 and wireless stations 1204, 1206, and 1208. In various embodiments, wireless network 1200 may comprise a wireless local area network (WLAN), such as a WLAN implementing one or more Institute of Electrical and Electronics Engineers (IEEE) 802.11/15 standards (sometimes collectively referred to as "Wi-Fi"). In some other embodiments, wireless network 1200 may comprise another type of wireless network, and/or may implement other wireless communications standards. In various embodiments, for example, wireless network 1200 may comprise a WWAN or WPAN rather than a WLAN. The embodiments are not limited to this example.

In some embodiments, wireless network 1200 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1204, 1206, and 1208 may communicate with access point 1202 in order to obtain connectivity to one or more external data networks. In some embodiments, for example, wireless stations 1204, 1206, and 1208 may connect to the Internet 1212 via access point 1202 and access network 1210. In various embodiments, access network 1210 may comprise a private network that provides subscription-based Internet-connectivity, such as an Internet Service Provider (ISP) network. The embodiments are not limited to this example.

In various embodiments, two or more of wireless stations 1204, 1206, and 1208 may communicate with each other directly by exchanging peer-to-peer communications. For example, in the example of FIG. 12, wireless stations 1204 and 1206 communicate with each other directly by exchanging peer-to-peer communications 1214. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a wireless communication device, at least a portion of the logic comprised in circuitry coupled to the memory, the logic to determine a channel usage configuration to be applied for a transmission of a packet to a remote device, the channel usage configuration to designate a primary channel and one or more transmission channels, generate a PHY header for the packet, the PHY header to comprise a first field comprising information indicating the one or more transmission channels, and a second field comprising information identifying the primary channel, and encode the PHY header for wireless transmission.

Example 2 is the apparatus of Example 1, the channel usage configuration to designate a single transmission channel.

Example 3 is the apparatus of Example 2, the single transmission channel to comprise a 2.16 GHz channel.

Example 4 is the apparatus of Example 3, the primary channel to comprise a same 2.16 GHz channel as the single transmission channel.

Example 5 is the apparatus of Example 3, the primary channel to comprise a second 2.16 GHz channel.

Example 6 is the apparatus of Example 2, the single transmission channel to comprise a 4.32 GHz channel, a 6.48 GHz channel, or an 8.64 GHz channel.

Example 7 is the apparatus of Example 6, the primary channel to comprise an in-band 2.16 GHz channel that overlaps the single transmission channel.

Example 8 is the apparatus of Example 6, the primary channel to comprise an out-of-band 2.16 GHz channel that does not overlap the single transmission channel.

Example 9 is the apparatus of Example 1, the channel usage configuration to designate multiple transmission channels.

Example 10 is the apparatus of Example 9, the channel usage configuration to designate two 2.16 GHz transmission channels.

Example 11 is the apparatus of Example 10, the primary channel to comprise a same 2.16 GHz channel as one of the two 2.16 GHz transmission channels.

Example 12 is the apparatus of Example 10, the primary channel to comprise a third 2.16 GHz channel.

Example 13 is the apparatus of any of Examples 1 to 12, the first field to comprise an index value indicating the one or more transmission channels.

Example 14 is the apparatus of any of Examples 1 to 12, the first field to comprise a bitmap indicating the one or more transmission channels.

Example 15 is the apparatus of Example 14, the bitmap to comprise 8 bits.

Example 16 is the apparatus of Example 15, each of the 8 bits to correspond to a respective 2.16 GHz channel.

Example 17 is the apparatus of any of Examples 1 to 16, the second field to comprise a three-bit value.

Example 18 is the apparatus of Example 17, the three-bit value to indicate which one of eight 2.16 GHz channels constitutes the primary channel.

Example 19 is the apparatus of any of Examples 1 to 18, the PHY header to comprise a bit indicating whether channel aggregation is to be used for transmission of the packet.

Example 20 is the apparatus of Example 19, the logic to set the bit to indicate that channel aggregation is to be used when the channel usage configuration designates more than one transmission channel.

Example 21 is a system, comprising an apparatus according to any of Examples 1 to 20, and at least one radio frequency (RF) transceiver.

Example 22 is the system of Example 21, comprising at least one processor.

Example 23 is the system of any of Examples 21 to 22, comprising at least one RF antenna.

Example 24 is an apparatus, comprising a memory, and logic for a wireless communication device, at least a portion of the logic comprised in circuitry coupled to the memory, the logic to decode a PHY header for a packet to be received from a remote device, the PHY header to indicate a channel usage configuration to be applied for reception of the packet, identify, based on a first field comprised in the PHY header, a primary channel designated by the channel usage configuration, identify, based on a second field comprised in the PHY header, one or more transmission channels designated by the channel usage configuration, and receive a data field of the packet via the one or more transmission channels.

Example 25 is the apparatus of Example 24, the channel usage configuration to designate a single transmission channel.

Example 26 is the apparatus of Example 25, the single transmission channel to comprise a 2.16 GHz channel.

Example 27 is the apparatus of Example 26, the primary channel to comprise a same 2.16 GHz channel as the single transmission channel.

Example 28 is the apparatus of Example 26, the primary channel to comprise a second 2.16 GHz channel.

Example 29 is the apparatus of Example 25, the single transmission channel to comprise a 4.32 GHz channel, a 6.48 GHz channel, or an 8.64 GHz channel.

Example 30 is the apparatus of Example 29, the primary channel to comprise an in-band 2.16 GHz channel that overlaps the single transmission channel.

Example 31 is the apparatus of Example 29, the primary channel to comprise an out-of-band 2.16 GHz channel that does not overlap the single transmission channel.

Example 32 is the apparatus of Example 24, the channel usage configuration to designate multiple transmission channels.

Example 33 is the apparatus of Example 32, the channel usage configuration to designate two 2.16 GHz transmission channels.

Example 34 is the apparatus of Example 33, the primary channel to comprise a same 2.16 GHz channel as one of the two 2.16 GHz transmission channels.

Example 35 is the apparatus of Example 33, the primary channel to comprise a third 2.16 GHz channel.

Example 36 is the apparatus of any of Examples 24 to 35, the second field to comprise an index value indicating the one or more transmission channels.

Example 37 is the apparatus of any of Examples 24 to 35, the second field to comprise a bitmap indicating the one or more transmission channels.

Example 38 is the apparatus of Example 37, the bitmap to comprise 8 bits.

Example 39 is the apparatus of Example 38, each of the 8 bits to correspond to a respective 2.16 GHz channel.

Example 40 is the apparatus of any of Examples 24 to 39, the first field to comprise a three-bit value.

Example 41 is the apparatus of Example 40, the three-bit value to indicate which one of eight 2.16 GHz channels constitutes the primary channel.

Example 42 is the apparatus of any of Examples 24 to 41, the PHY header to comprise a bit indicating whether channel aggregation is to be used for transmission of the packet.

Example 43 is a system, comprising an apparatus according to any of Examples 24 to 42, and at least one radio frequency (RF) transceiver.

Example 44 is the system of Example 43, comprising at least one processor.

Example 45 is the system of any of Examples 43 to 44, comprising at least one RF antenna.

Example 46 is at least one non-transitory computer-readable storage medium comprising a set of instructions that, in response to being executed at a wireless communication device, cause the wireless communication device to determine a channel usage configuration to be applied for a transmission of a packet to a remote device, the channel usage configuration to designate a primary channel and one or more transmission channels, generate a PHY header for the packet, the PHY header to comprise a first field comprising information indicating the one or more transmission channels, and a second field comprising information identifying the primary channel, and encode the PHY header for wireless transmission.

Example 47 is the at least one non-transitory computer-readable storage medium of Example 46, the channel usage configuration to designate a single transmission channel.

Example 48 is the at least one non-transitory computer-readable storage medium of Example 47, the single transmission channel to comprise a 2.16 GHz channel.

Example 49 is the at least one non-transitory computer-readable storage medium of Example 48, the primary channel to comprise a same 2.16 GHz channel as the single transmission channel.

Example 50 is the at least one non-transitory computer-readable storage medium of Example 48, the primary channel to comprise a second 2.16 GHz channel.

Example 51 is the at least one non-transitory computer-readable storage medium of Example 47, the single transmission channel to comprise a 4.32 GHz channel, a 6.48 GHz channel, or an 8.64 GHz channel.

Example 52 is the at least one non-transitory computer-readable storage medium of Example 51, the primary channel to comprise an in-band 2.16 GHz channel that overlaps the single transmission channel.

Example 53 is the at least one non-transitory computer-readable storage medium of Example 51, the primary channel to comprise an out-of-band 2.16 GHz channel that does not overlap the single transmission channel.

Example 54 is the at least one non-transitory computer-readable storage medium of Example 46, the channel usage configuration to designate multiple transmission channels.

Example 55 is the at least one non-transitory computer-readable storage medium of Example 54, the channel usage configuration to designate two 2.16 GHz transmission channels.

Example 56 is the at least one non-transitory computer-readable storage medium of Example 55, the primary channel to comprise a same 2.16 GHz channel as one of the two 2.16 GHz transmission channels.

Example 57 is the at least one non-transitory computer-readable storage medium of Example 55, the primary channel to comprise a third 2.16 GHz channel.

Example 58 is the at least one non-transitory computer-readable storage medium of any of Examples 46 to 57, the first field to comprise an index value indicating the one or more transmission channels.

Example 59 is the at least one non-transitory computer-readable storage medium of any of Examples 46 to 57, the first field to comprise a bitmap indicating the one or more transmission channels.

Example 60 is the at least one non-transitory computer-readable storage medium of Example 59, the bitmap to comprise 8 bits.

Example 61 is the at least one non-transitory computer-readable storage medium of Example 60, each of the 8 bits to correspond to a respective 2.16 GHz channel.

Example 62 is the at least one non-transitory computer-readable storage medium of any of Examples 46 to 61, the second field to comprise a three-bit value.

Example 63 is the at least one non-transitory computer-readable storage medium of Example 62, the three-bit value to indicate which one of eight 2.16 GHz channels constitutes the primary channel.

Example 64 is the at least one non-transitory computer-readable storage medium of any of Examples 46 to 63, the PHY header to comprise a bit indicating whether channel aggregation is to be used for transmission of the packet.

Example 65 is the at least one non-transitory computer-readable storage medium of Example 64, comprising instructions that, in response to being executed at the wireless communication device, cause the wireless communication device to set the bit to indicate that channel aggregation is to be used when the channel usage configuration designates more than one transmission channel.

Example 66 is at least one non-transitory computer-readable storage medium comprising a set of instructions that, in response to being executed at a wireless communication device, cause the wireless communication device to decode a PHY header for a packet to be received from a remote device, the PHY header to indicate a channel usage configuration to be applied for reception of the packet, identify, based on a first field comprised in the PHY header, a primary channel designated by the channel usage configuration, identify, based on a second field comprised in the PHY header, one or more transmission channels designated by the channel usage configuration, and receive a data field of the packet via the one or more transmission channels.

Example 67 is the at least one non-transitory computer-readable storage medium of Example 66, the channel usage configuration to designate a single transmission channel.

Example 68 is the at least one non-transitory computer-readable storage medium of Example 67, the single transmission channel to comprise a 2.16 GHz channel.

Example 69 is the at least one non-transitory computer-readable storage medium of Example 68, the primary channel to comprise a same 2.16 GHz channel as the single transmission channel.

Example 70 is the at least one non-transitory computer-readable storage medium of Example 68, the primary channel to comprise a second 2.16 GHz channel.

Example 71 is the at least one non-transitory computer-readable storage medium of Example 67, the single transmission channel to comprise a 4.32 GHz channel, a 6.48 GHz channel, or an 8.64 GHz channel.

Example 72 is the at least one non-transitory computer-readable storage medium of Example 71, the primary channel to comprise an in-band 2.16 GHz channel that overlaps the single transmission channel.

Example 73 is the at least one non-transitory computer-readable storage medium of Example 71, the primary channel to comprise an out-of-band 2.16 GHz channel that does not overlap the single transmission channel.

Example 74 is the at least one non-transitory computer-readable storage medium of Example 66, the channel usage configuration to designate multiple transmission channels.

Example 75 is the at least one non-transitory computer-readable storage medium of Example 74, the channel usage configuration to designate two 2.16 GHz transmission channels.

Example 76 is the at least one non-transitory computer-readable storage medium of Example 75, the primary channel to comprise a same 2.16 GHz channel as one of the two 2.16 GHz transmission channels.

Example 77 is the at least one non-transitory computer-readable storage medium of Example 75, the primary channel to comprise a third 2.16 GHz channel.

Example 78 is the at least one non-transitory computer-readable storage medium of any of Examples 66 to 77, the second field to comprise an index value indicating the one or more transmission channels.

Example 79 is the at least one non-transitory computer-readable storage medium of any of Examples 66 to 77, the second field to comprise a bitmap indicating the one or more transmission channels.

Example 80 is the at least one non-transitory computer-readable storage medium of Example 79, the bitmap to comprise 8 bits.

Example 81 is the at least one non-transitory computer-readable storage medium of Example 80, each of the 8 bits to correspond to a respective 2.16 GHz channel.

Example 82 is the at least one non-transitory computer-readable storage medium of any of Examples 66 to 81, the first field to comprise a three-bit value.

Example 83 is the at least one non-transitory computer-readable storage medium of Example 82, the three-bit value to indicate which one of eight 2.16 GHz channels constitutes the primary channel.

Example 84 is the at least one non-transitory computer-readable storage medium of any of Examples 66 to 83, the PHY header to comprise a bit indicating whether channel aggregation is to be used for transmission of the packet.

Example 85 is a method, comprising determining, by circuitry of a wireless communication device, a channel usage configuration to be applied for a transmission of a packet to a remote device, the channel usage configuration to designate a primary channel and one or more transmission channels, generating a PHY header for the packet, the PHY header to comprise a first field comprising information indicating the one or more transmission channels, and a second field comprising information identifying the primary channel, and encoding the PHY header for wireless transmission.

Example 86 is the method of Example 85, the channel usage configuration to designate a single transmission channel.

Example 87 is the method of Example 86, the single transmission channel to comprise a 2.16 GHz channel.

Example 88 is the method of Example 87, the primary channel to comprise a same 2.16 GHz channel as the single transmission channel.

Example 89 is the method of Example 87, the primary channel to comprise a second 2.16 GHz channel.

Example 90 is the method of Example 86, the single transmission channel to comprise a 4.32 GHz channel, a 6.48 GHz channel, or an 8.64 GHz channel.

Example 91 is the method of Example 90, the primary channel to comprise an in-band 2.16 GHz channel that overlaps the single transmission channel.

Example 92 is the method of Example 90, the primary channel to comprise an out-of-band 2.16 GHz channel that does not overlap the single transmission channel.

Example 93 is the method of Example 85, the channel usage configuration to designate multiple transmission channels.

Example 94 is the method of Example 93, the channel usage configuration to designate two 2.16 GHz transmission channels.

Example 95 is the method of Example 94, the primary channel to comprise a same 2.16 GHz channel as one of the two 2.16 GHz transmission channels.

Example 96 is the method of Example 94, the primary channel to comprise a third 2.16 GHz channel.

Example 97 is the method of any of Examples 85 to 96, the first field to comprise an index value indicating the one or more transmission channels.

Example 98 is the method of any of Examples 85 to 96, the first field to comprise a bitmap indicating the one or more transmission channels.

Example 99 is the method of Example 98, the bitmap to comprise 8 bits.

Example 100 is the method of Example 99, each of the 8 bits to correspond to a respective 2.16 GHz channel.

Example 101 is the method of any of Examples 85 to 100, the second field to comprise a three-bit value.

Example 102 is the method of Example 101, the three-bit value to indicate which one of eight 2.16 GHz channels constitutes the primary channel.

Example 103 is the method of any of Examples 85 to 102, the PHY header to comprise a bit indicating whether channel aggregation is to be used for transmission of the packet.

Example 104 is the method of Example 103, comprising setting the bit to indicate that channel aggregation is to be used when the channel usage configuration designates more than one transmission channel.

Example 105 is at least one non-transitory computer-readable storage medium comprising a set of instructions that, in response to being executed on a computing device, cause the computing device to perform a method according to any of Examples 85 to 104.

Example 106 is an apparatus, comprising means for performing a method according to any of Examples 85 to 104.

Example 107 is a system, comprising the apparatus of Example 106, and at least one radio frequency (RF) transceiver.

Example 108 is the system of Example 107, comprising at least one processor.

Example 109 is the system of any of Examples 107 to 108, comprising at least one RF antenna.

Example 110 is a method, comprising decoding, by circuitry of a wireless communication device, a PHY header for a packet to be received from a remote device, the PHY header to indicate a channel usage configuration to be applied for reception of the packet, identifying, based on a first field comprised in the PHY header, a primary channel designated by the channel usage configuration, identifying, based on a second field comprised in the PHY header, one or more transmission channels designated by the channel usage configuration, and receiving a data field of the packet via the one or more transmission channels.

Example 111 is the method of Example 110, the channel usage configuration to designate a single transmission channel.

Example 112 is the method of Example 111, the single transmission channel to comprise a 2.16 GHz channel.

Example 113 is the method of Example 112, the primary channel to comprise a same 2.16 GHz channel as the single transmission channel.

Example 114 is the method of Example 112, the primary channel to comprise a second 2.16 GHz channel.

Example 115 is the method of Example 111, the single transmission channel to comprise a 4.32 GHz channel, a 6.48 GHz channel, or an 8.64 GHz channel.

Example 116 is the method of Example 115, the primary channel to comprise an in-band 2.16 GHz channel that overlaps the single transmission channel.

Example 117 is the method of Example 115, the primary channel to comprise an out-of-band 2.16 GHz channel that does not overlap the single transmission channel.

Example 118 is the method of Example 110, the channel usage configuration to designate multiple transmission channels.

Example 119 is the method of Example 118, the channel usage configuration to designate two 2.16 GHz transmission channels.

Example 120 is the method of Example 119, the primary channel to comprise a same 2.16 GHz channel as one of the two 2.16 GHz transmission channels.

Example 121 is the method of Example 119, the primary channel to comprise a third 2.16 GHz channel.

Example 122 is the method of any of Examples 110 to 121, the second field to comprise an index value indicating the one or more transmission channels.

Example 123 is the method of any of Examples 110 to 121, the second field to comprise a bitmap indicating the one or more transmission channels.

Example 124 is the method of Example 123, the bitmap to comprise 8 bits.

Example 125 is the method of Example 124, each of the 8 bits to correspond to a respective 2.16 GHz channel.

Example 126 is the method of any of Examples 110 to 125, the first field to comprise a three-bit value.

Example 127 is the method of Example 126, the three-bit value to indicate which one of eight 2.16 GHz channels constitutes the primary channel.

Example 128 is the method of any of Examples 110 to 127, the PHY header to comprise a bit indicating whether channel aggregation is to be used for transmission of the packet.

Example 129 is at least one non-transitory computer-readable storage medium comprising a set of instructions that, in response to being executed on a computing device, cause the computing device to perform a method according to any of Examples 110 to 128.

Example 130 is an apparatus, comprising means for performing a method according to any of Examples 110 to 128.

Example 131 is a system, comprising the apparatus of Example 130, and at least one radio frequency (RF) transceiver.

Example 132 is the system of Example 131, comprising at least one processor.

Example 133 is the system of any of Examples 131 to 132, comprising at least one RF antenna.

Example 134 is an apparatus, comprising means for determining a channel usage configuration to be applied for a transmission of a packet from a wireless communication device to a remote device, the channel usage configuration to designate a primary channel and one or more transmission channels, means for generating a PHY header for the packet, the PHY header to comprise a first field comprising information indicating the one or more transmission channels, and a second field comprising information identifying the primary channel, and means for encoding the PHY header for wireless transmission.

Example 135 is the apparatus of Example 134, the channel usage configuration to designate a single transmission channel.

Example 136 is the apparatus of Example 135, the single transmission channel to comprise a 2.16 GHz channel.

Example 137 is the apparatus of Example 136, the primary channel to comprise a same 2.16 GHz channel as the single transmission channel.

Example 138 is the apparatus of Example 136, the primary channel to comprise a second 2.16 GHz channel.

Example 139 is the apparatus of Example 135, the single transmission channel to comprise a 4.32 GHz channel, a 6.48 GHz channel, or an 8.64 GHz channel.

Example 140 is the apparatus of Example 139, the primary channel to comprise an in-band 2.16 GHz channel that overlaps the single transmission channel.

Example 141 is the apparatus of Example 139, the primary channel to comprise an out-of-band 2.16 GHz channel that does not overlap the single transmission channel.

Example 142 is the apparatus of Example 134, the channel usage configuration to designate multiple transmission channels.

Example 143 is the apparatus of Example 142, the channel usage configuration to designate two 2.16 GHz transmission channels.

Example 144 is the apparatus of Example 143, the primary channel to comprise a same 2.16 GHz channel as one of the two 2.16 GHz transmission channels.

Example 145 is the apparatus of Example 143, the primary channel to comprise a third 2.16 GHz channel.

Example 146 is the apparatus of any of Examples 134 to 145, the first field to comprise an index value indicating the one or more transmission channels.

Example 147 is the apparatus of any of Examples 134 to 145, the first field to comprise a bitmap indicating the one or more transmission channels.

Example 148 is the apparatus of Example 147, the bitmap to comprise 8 bits.

Example 149 is the apparatus of Example 148, each of the 8 bits to correspond to a respective 2.16 GHz channel.

Example 150 is the apparatus of any of Examples 134 to 149, the second field to comprise a three-bit value.

Example 151 is the apparatus of Example 150, the three-bit value to indicate which one of eight 2.16 GHz channels constitutes the primary channel.

Example 152 is the apparatus of any of Examples 134 to 151, the PHY header to comprise a bit indicating whether channel aggregation is to be used for transmission of the packet.

Example 153 is the apparatus of Example 152, comprising means for setting the bit to indicate that channel aggregation is to be used when the channel usage configuration designates more than one transmission channel.

Example 154 is a system, comprising an apparatus according to any of Examples 134 to 153, and at least one radio frequency (RF) transceiver.

Example 155 is the system of Example 154, comprising at least one processor.

Example 156 is the system of any of Examples 154 to 155, comprising at least one RF antenna.

Example 157 is an apparatus, comprising means for decoding, at a wireless communication device, a PHY header for a packet to be received from a remote device, the PHY header to indicate a channel usage configuration to be applied for reception of the packet, means for identifying, based on a first field comprised in the PHY header, a primary channel designated by the channel usage configuration, means for identifying, based on a second field comprised in the PHY header, one or more transmission channels designated by the channel usage configuration, and means for receiving a data field of the packet via the one or more transmission channels.

Example 158 is the apparatus of Example 157, the channel usage configuration to designate a single transmission channel.

Example 159 is the apparatus of Example 158, the single transmission channel to comprise a 2.16 GHz channel.

Example 160 is the apparatus of Example 159, the primary channel to comprise a same 2.16 GHz channel as the single transmission channel.

Example 161 is the apparatus of Example 159, the primary channel to comprise a second 2.16 GHz channel.

Example 162 is the apparatus of Example 158, the single transmission channel to comprise a 4.32 GHz channel, a 6.48 GHz channel, or an 8.64 GHz channel.

Example 163 is the apparatus of Example 162, the primary channel to comprise an in-band 2.16 GHz channel that overlaps the single transmission channel.

Example 164 is the apparatus of Example 162, the primary channel to comprise an out-of-band 2.16 GHz channel that does not overlap the single transmission channel.

Example 165 is the apparatus of Example 157, the channel usage configuration to designate multiple transmission channels.

Example 166 is the apparatus of Example 165, the channel usage configuration to designate two 2.16 GHz transmission channels.

Example 167 is the apparatus of Example 166, the primary channel to comprise a same 2.16 GHz channel as one of the two 2.16 GHz transmission channels.

Example 168 is the apparatus of Example 166, the primary channel to comprise a third 2.16 GHz channel.

Example 169 is the apparatus of any of Examples 157 to 168, the second field to comprise an index value indicating the one or more transmission channels.

Example 170 is the apparatus of any of Examples 157 to 168, the second field to comprise a bitmap indicating the one or more transmission channels.

Example 171 is the apparatus of Example 170, the bitmap to comprise 8 bits.

Example 172 is the apparatus of Example 171, each of the 8 bits to correspond to a respective 2.16 GHz channel.

Example 173 is the apparatus of any of Examples 157 to 172, the first field to comprise a three-bit value.

Example 174 is the apparatus of Example 173, the three-bit value to indicate which one of eight 2.16 GHz channels constitutes the primary channel.

Example 175 is the apparatus of any of Examples 157 to 174, the PHY header to comprise a bit indicating whether channel aggregation is to be used for transmission of the packet.

Example 176 is a system, comprising an apparatus according to any of Examples 157 to 175, and at least one radio frequency (RF) transceiver.

Example 177 is the system of Example 176, comprising at least one processor.

Example 178 is the system of any of Examples 176 to 177, comprising at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory; and
logic for a wireless communication device, at least a portion of the logic comprised in circuitry coupled to the memory, the logic to:
  determine a channel usage configuration to be applied for a transmission of a packet to a remote device, the channel usage configuration to designate a primary channel and one or more data transmission channels;
  generate a PHY header for the packet, the PHY header to comprise:
    a first field comprising information indicating the one or more data transmission channels, the first field to comprise a bitmap, the bitmap to comprise 8 bits, each bit of the 8 bits to correspond to a respective 2.16 gigahertz (GHz) channel; and
    a second field comprising information identifying the primary channel, the second field to comprise a three-bit value to indicate the primary channel, wherein the three-bit value comprises an index value, the index value based on the primary channel; and
  encode the PHY header for wireless transmission.

2. The apparatus of claim 1, the three-bit value indicating which one of the eight 2.16 GHz channels constitutes the primary channel.

3. The apparatus of claim 1, the primary channel to comprise an out-of-band primary channel.

4. The apparatus of claim 1, comprising at least one radio frequency (RF) transceiver.

5. An apparatus, comprising:
a memory; and
logic for a wireless communication device, at least a portion of the logic comprised in circuitry coupled to the memory, the logic to:
  decode a PHY header for a packet to be received from a remote device, the PHY header to indicate a channel usage configuration to be applied for reception of the packet;
  identify, based on a first field comprised in the PHY header, a primary channel designated by a three-bit value, wherein the three-bit value comprises an index value, the index value based on the primary channel;
  identify, based on a second field comprised in the PHY header, one or more data transmission channels designated by the channel usage configuration, the second field to comprise a bitmap, the bitmap to comprise 8 bits, each bit of the 8 bits to correspond to a respective 2.16 gigahertz (GHz) channel; and receive a data field of the packet via the one or more data transmission channels.

6. The apparatus of claim 5, the primary channel to comprise an out-of-band primary channel.

7. At least one non-transitory computer-readable storage medium comprising a set of instructions that, in response to being executed at a wireless communication device, cause the wireless communication device to:

determine a channel usage configuration to be applied for a transmission of a packet to a remote device, the channel usage configuration to designate a primary channel and one or more data transmission channels;

generate a PHY header for the packet, the PHY header to comprise:

a first field comprising information indicating the one or more data transmission channels, the first field to comprise a bitmap, the bitmap to comprise 8 bits, each bit of the 8 bits to correspond to a respective 2.16 gigahertz (GHz) channel; and a second field comprising information identifying the primary channel, the second field to comprise a three-bit value to indicate the primary channel, wherein the three-bit value comprises an index value, the index value based on the primary channel; and encode the PHY header for wireless transmission.

8. The at least one non-transitory computer-readable storage medium of claim 7, the three-bit value indicating which one of the eight 2.16 GHz channels constitutes the primary channel.

9. The at least one non-transitory computer-readable storage medium of claim 7, the primary channel to comprise an out-of-band primary channel.

10. At least one non-transitory computer-readable storage medium comprising a set of instructions that, in response to being executed at a wireless communication device, cause the wireless communication device to:

decode a PHY header for a packet to be received from a remote device, the PHY header to indicate a channel usage configuration to be applied for reception of the packet;

identify, based on a first field comprised in the PHY header, a primary channel designated by a three-bit value, wherein the three-bit value comprises an index value, the index value based on the primary channel;

identify, based on a second field comprised in the PHY header, one or more data transmission channels designated by the channel usage configuration, the second field to comprise a bitmap, the bitmap to comprise 8 bits, each bit of the 8 bits to correspond to a respective 2.16 gigahertz (GHz) channel; and receive a data field of the packet via the one or more data transmission channels.

11. The at least one non-transitory computer-readable storage medium of claim 10, the first field to comprise a value indicating which of eight 2.16 GHz channels constitutes the primary channel.

12. The at least one non-transitory computer-readable storage medium of claim 10, the primary channel to comprise an out-of-band primary channel.

* * * * *